United States Patent
Sugano et al.

(10) Patent No.: US 9,243,081 B2
(45) Date of Patent: Jan. 26, 2016

(54) SOLID CATALYST COMPONENT FOR POLYMERIZATION OF OLEFIN, CATALYST FOR POLYMERIZATION OF OLEFIN, AND METHOD FOR PRODUCING OLEFIN POLYMER

(75) Inventors: Toshihiko Sugano, Chigasaki (JP); Toshiya Uozumi, Chigasaki (JP); Noriaki Nakamura, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 30 days.

(21) Appl. No.: 14/344,431

(22) PCT Filed: May 9, 2012

(86) PCT No.: PCT/JP2012/061844
§ 371 (c)(1),
(2), (4) Date: Mar. 12, 2014

(87) PCT Pub. No.: WO2013/042400
PCT Pub. Date: Mar. 28, 2013

(65) Prior Publication Data
US 2014/0343237 A1    Nov. 20, 2014

(30) Foreign Application Priority Data
Sep. 20, 2011 (JP) ................. 2011-204738

(51) Int. Cl.
C08F 4/16        (2006.01)
C08F 10/00      (2006.01)

(52) U.S. Cl.
CPC .. *C08F 4/16* (2013.01); *C08F 10/00* (2013.01)

(58) Field of Classification Search
CPC ....................................................... C08F 4/16
See application file for complete search history.

(56) References Cited

U.S. PATENT DOCUMENTS

| 4,647,550 A | 3/1987 | Kohora et al. |
| 5,332,707 A | 7/1994 | Karayannis et al. |

(Continued)

FOREIGN PATENT DOCUMENTS

| JP | 57 63310 | 4/1982 |
| JP | 58 083006 | 5/1983 |
| JP | 60 130607 | 7/1985 |

(Continued)

OTHER PUBLICATIONS

Office Action issued Jun. 26, 2014, in Japanese Patent Application No. 2013-534609 with English translation.

(Continued)

*Primary Examiner* — Ling Choi
*Assistant Examiner* — Catherine S Branch
(74) *Attorney, Agent, or Firm* — Oblon, McClelland, Maier & Neustadt, L.L.P.

(57) ABSTRACT

A solid catalyst component for olefin polymerization includes titanium, magnesium, a halogen, and a compound represented by the following formula (1): $R^1O$—$C(=O)$—$O$—$Z$—$OR^2$, and an olefin polymerization catalyst includes the solid catalyst component, an organoaluminum compound, and an optional external electron donor compound. An olefin polymer that has a moderate molecular weight distribution while maintaining high stereoregularity can be produced by utilizing the solid catalyst component and the olefin polymerization catalyst.

13 Claims, 1 Drawing Sheet

(56) References Cited

U.S. PATENT DOCUMENTS

| | | |
|---|---|---|
| 6,124,507 A | 9/2000 | Wilson et al. |
| 2003/0055179 A1 | 3/2003 | Ota et al. |

FOREIGN PATENT DOCUMENTS

| | | |
|---|---|---|
| JP | 61 037803 | 2/1986 |
| JP | 64 081803 | 3/1989 |
| JP | 06 100639 | 4/1994 |
| JP | 7 509529 | 10/1995 |
| JP | 11 263742 | 9/1999 |
| JP | 2002 097237 | 4/2002 |
| JP | 2005 187550 | 7/2005 |
| JP | 2005 539108 | 12/2005 |
| JP | 2008-533241 | 8/2008 |
| JP | 2009 209309 | 9/2009 |
| WO | 01 44320 | 6/2001 |
| WO | 2006 077945 | 7/2006 |

OTHER PUBLICATIONS

U.S. Appl. No. 14/131,052, filed Apr. 9, 2014, Uozumi, et al.
International Search Report Issued Jul. 17, 2012 in PCT/JP12/061844 Filed May 9, 2012.

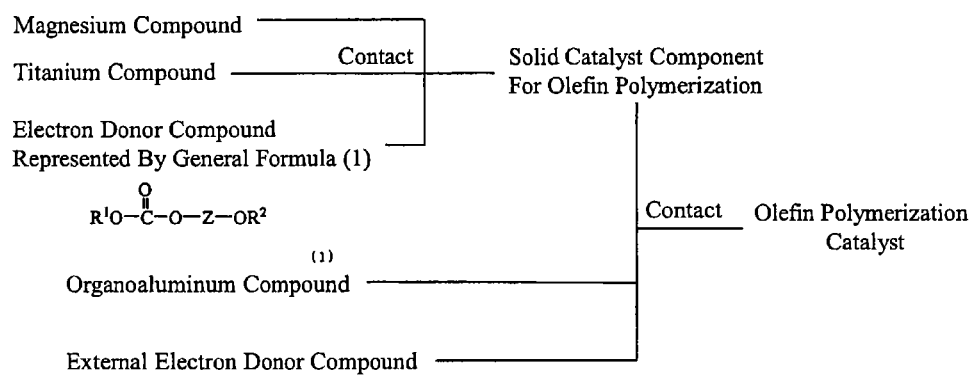

SOLID CATALYST COMPONENT FOR POLYMERIZATION OF OLEFIN, CATALYST FOR POLYMERIZATION OF OLEFIN, AND METHOD FOR PRODUCING OLEFIN POLYMER

TECHNICAL FIELD

The invention relates to a solid catalyst component for olefin polymerization, an olefin polymerization catalyst, and a method for producing an olefin polymer that make it possible to obtain an olefin polymer having a moderate molecular weight distribution in high yield while maintaining high polymerization activity and high stereoregularity.

BACKGROUND ART

A solid catalyst component that includes magnesium, titanium, an electron donor compound, and a halogen as essential components has been used when polymerizing an olefin (e.g., propylene). A number of methods have been proposed that polymerize or copolymerize an olefin in the presence of an olefin polymerization catalyst that includes the solid catalyst component, an organoaluminum compound, and an organosilicon compound.

For example, JP-A-57-63310 (Patent Document 1) discloses that excellent polymerization activity and stereospecificity are obtained when using a solid titanium catalyst component that supports a specific electron donor, an organoaluminum compound (promoter component), and a silicon compound having at least one Si—OR linkage (wherein R is a hydrocarbon group).

JP-A-58-83006 (Patent Document 2) discloses using a phthalic ester as the specific electron donor, and JP-A-60-130607 (Patent Document 3) discloses using a cellosolve ester as the specific electron donor.

However, a solid catalyst component that supports such an electron donor does not necessarily ensure satisfactory polymerization activity and stereoregularity. JP-T-2005-539108 (Patent Document 4) discloses a solid catalyst component that utilizes a succinic ester, and WO2006/077945 (Patent Document 5) discloses a solid catalyst component that utilizes a cyclic ester having a structure similar to that of a succinic ester. It is suggested that an olefin polymer having a wide molecular weight distribution may be obtained using such a solid catalyst component.

JP-A-2005-187550 (Patent Document 6) discloses a technique that uses a 1,3-diether as an internal electron donor or an external electron donor. It is suggested that an olefin polymer having a narrow molecular weight distribution may be obtained using such a catalyst system.

RELATED-ART DOCUMENT

Patent Document

Patent Document 1: JP-A-57-63310
Patent Document 2: JP-A-58-83006
Patent Document 3: JP-A-60-130607
Patent Document 4: JP-T-2005-539108
Patent Document 5: WO2006/077945
Patent Document 6: JP-A-2005-187550

SUMMARY OF THE INVENTION

Technical Problem

A catalyst used for stereospecific (stereoregular) polymerization of an olefin is required to exhibit various types of polymerization performance (e.g., activity, stereoregularity, molecular weight distribution, continuous activity, MFR controllability (hydrogen response), and bulk density). Since the required performance differs depending on the application, a variety of solid catalyst components and catalysts that differ in characteristics have been desired. When using the above solid catalyst component, however, activity or stereoregularity may be insufficient, or only a polymer having a narrow or wide molecular weight distribution may be produced (i.e., it may be difficult to control the molecular weight distribution of the resulting olefin polymer within a moderate range). It is desired to control the molecular weight distribution (e.g., "Mw/Mn") of a general-purpose polymer within the range of about 4 to about 6. It is considered that a solid catalyst component that ensures excellent performance (i.e., crystallinity and polymerization activity) while achieving a molecular weight distribution within the above range is most useful.

An object of the invention is to provide a novel solid catalyst component for olefin polymerization and a novel olefin polymerization catalyst that exhibit high polymerization activity, and can produce an olefin polymer having high stereoregularity and a moderate molecular weight distribution (Mw/Mn) that ensures sufficient moldability (formability), and a method for producing an olefin polymer using the same.

Solution to Problem

In view of the above situation, the inventors of the invention conducted extensive studies, and found that an olefin polymerization catalyst that essentially includes a solid titanium catalyst component (I) including titanium, magnesium, a halogen, and a specific compound that includes an ether group and a carbonate group ensures high stereoregularity and high polymerization activity, and can control the molecular weight distribution (Mw/Mn) of the resulting polymer within the range of about 4 to about 6 due to the three-dimensional structure of the compound (including a substituent). This finding has led to the completion of the invention.

According to one aspect of the invention, a solid catalyst component for olefin polymerization includes titanium, magnesium, a halogen, and a compound represented by the following general formula (1).

(1)

wherein $R^1$ and $R^2$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 2 to 24 carbon atoms that is terminated by a carbon atom, an oxygen atom-containing hydrocarbon group having 2 to 24 carbon atoms that is terminated by a carbon atom, a phosphorus-containing hydrocarbon group having 2 to 24 carbon atoms that is terminated by a carbon atom, or a silicon-containing hydrocarbon group having 1 to 24 carbon atoms, provided that $R^1$ and $R^2$ are either identical or different, the nitrogen atom-containing hydrocarbon group having 2 to 24 carbon atoms excludes a group that is terminated by a C=N group, the oxygen atom-containing hydrocarbon group having 2 to 24 carbon atoms excludes a group that is terminated by a carbonyl group, and the phosphorus-containing hydrocarbon group having 2 to 24 carbon atoms excludes a group that is terminated by a C=P group, and Z is a linking group that includes a carbon atom or a carbon chain.

According to another aspect of the invention, an olefin polymerization catalyst includes (I) the solid catalyst component, (II) an organoaluminum compound represented by the following general formula (2), and (III) an optional external electron donor compound.

wherein $R^3$ is a hydrocarbyl group having 1 to 6 carbon atoms, provided that a plurality of $R^3$ are either identical or different when a plurality of $R^3$ are present, Q is a hydrogen atom, a hydrocarbyloxy group having 1 to 6 carbon atoms, or a halogen atom, and p is a real number that satisfies $0 < p \leq 3$.

According to a further aspect of the invention, a method for producing an olefin polymer includes polymerizing an olefin in the presence of the olefin polymerization catalyst.

Advantageous Effects of the Invention

An olefin polymer having high stereoregularity and a moderate molecular weight distribution can be obtained in high yield by utilizing the solid catalyst component and the olefin polymerization catalyst according to the aspects of the invention.

BRIEF DESCRIPTION OF DRAWINGS

FIG. 1 is a flowchart illustrating a process for producing a polymerization catalyst according to one embodiment of the invention.

DESCRIPTION OF EMBODIMENTS

Solid Catalyst Component for Olefin Polymerization

A solid catalyst component for olefin polymerization (hereinafter may be referred to as "component (I)" or "solid catalyst component (I)") according to one embodiment of the invention includes magnesium, titanium, a halogen, and an electron donor compound represented by the general formula (1) (hereinafter may be referred to as "component (A)" or "compound (A)") as essential components.

Examples of the halogen include fluorine, chlorine, bromine, and iodine. Among these, chlorine, bromine, and iodine are preferable, and chlorine and iodine are particularly preferable.

Examples of the linear alkyl group having 1 to 20 carbon atoms represented by $R^1$ and $R^2$ in the general formula (1) include a methyl group, an ethyl group, an n-propyl group, an n-butyl group, an n-pentyl group, an n-hexyl group, an n-heptyl group, an n-octyl group, an n-nonyl group, an n-decyl group, and the like. Among these, linear alkyl groups having 1 to 12 carbon atoms are preferable.

Examples of the branched alkyl group having 3 to 20 carbon atoms represented by $R^1$ and $R^2$ in the general formula (1) include alkyl groups that include a secondary carbon atom or a tertiary carbon atom (e.g., isopropyl group, isobutyl group, t-butyl group, isopentyl group, and neopentyl group). Among these, branched alkyl groups having 3 to 12 carbon atoms are preferable.

Examples of the linear alkenyl group having 3 to 20 carbon atoms represented by $R^1$ and $R^2$ include an allyl group, a 3-butenyl group, a 4-hexenyl group, a 5-hexenyl group, a 7-octenyl group, a 10-dodecenyl group, and the like. Among these, linear alkenyl groups having 3 to 12 carbon atoms are preferable. Examples of the branched alkenyl group having 3 to 20 carbon atoms include an isopropenyl group, an isobutenyl group, an isopentenyl group, a 2-ethyl-3-hexenyl group, and the like. Among these, branched alkenyl groups having 3 to 12 carbon atoms are preferable.

Examples of the linear halogen-substituted alkyl group having 1 to 20 carbon atoms represented by $R^1$ and $R^2$ include a methyl halide group, an ethyl halide group, an n-propyl halide group, an n-butyl halide group, an n-pentyl halide group, an n-hexyl halide group, an n-pentyl halide group, an n-octyl halide group, a nonyl halide group, a decyl halide group, a halogen-substituted undecyl group, a halogen-substituted dodecyl group, and the like. Among these, linear halogen-substituted alkyl groups having 1 to 12 carbon atoms are preferable. Examples of the branched halogen-substituted alkyl group having 3 to 20 carbon atoms include an isopropyl halide group, an isobutyl halide group, a 2-ethylhexyl halide group, a neopentyl halide group, and the like. Among these, branched halogen-substituted alkyl groups having 3 to 12 carbon atoms are preferable.

Examples of the linear halogen-substituted alkenyl group having 2 to 20 carbon atoms represented by $R^1$ and $R^2$ include a 2-halogenated vinyl group, a 3-halogenated allyl group, a 3-halogenated 2-butenyl group, a 4-halogenated 3-butenyl group, a perhalogenated 2-butenyl group, a 6-halogenated 4-hexenyl group, a 3-trishalogenated methyl-2-propenyl group, and the like. Among these, halogen-substituted alkenyl groups having 2 to 12 carbon atoms are preferable. Examples of the branched halogen-substituted alkenyl group having 3 to 20 carbon atoms include a 3-trihalogenated 2-butenyl group, a 2-pentahalogenated ethyl-3-hexenyl group, a 6-halogenated 3-ethyl-4-hexenyl group, a 3-halogenated isobutenyl group, and the like. Among these, branched halogen-substituted alkenyl groups having 3 to 12 carbon atoms are preferable.

Examples of the cycloalkyl group having 3 to 20 carbon atoms represented by $R^1$ and $R^2$ include a cyclopropyl group, a cyclobutyl group, a cyclopentyl group, a tetramethylcyclopentyl group, a cyclohexyl group, a methylcyclohexyl group, a cycloheptyl group, a cyclooctyl group, a cyclononyl group, a cyclodecyl group, a butylcyclopentyl group, and the like. Among these, cycloalkyl groups having 3 to 12 carbon atoms are preferable. Examples of the cycloalkenyl group having 3 to 20 carbon atoms include a cyclopropenyl group, a cyclopentenyl group, a cyclohexenyl group, a cyclooctenyl group, a norbornene group, and the like. Among these, cycloalkenyl groups having 3 to 12 carbon atoms are preferable.

Examples of the halogen-substituted cycloalkyl group having 3 to 20 carbon atoms represented by $R^1$ and $R^2$ include a halogen-substituted cyclopropyl group, a halogen-substituted cyclobutyl group, a halogen-substituted cyclopentyl group, a halogen-substituted trimethylcyclopentyl group, a halogen-substituted cyclohexyl group, a halogen-substituted methylcyclohexyl group, a halogen-substituted cycloheptyl group, a halogen-substituted cyclooctyl group, a halogen-substituted cyclononyl group, a halogen-substituted cyclodecyl group, a halogen-substituted butylcyclopentyl group, and the like. Among these, halogen-substituted cycloalkyl groups having 3 to 12 carbon atoms are preferable.

Examples of the halogen-substituted cycloalkenyl group having 3 to 20 carbon atoms represented by $R^1$ and $R^2$ include a halogen-substituted cyclopropenyl group, a halogen-substituted cyclobutenyl group, a halogen-substituted cyclopentenyl group, a halogen-substituted trimethylcyclopentenyl group, a halogen-substituted cyclohexenyl group, a halogen-substituted methylcyclohexenyl group, a halogen-substituted cycloheptenyl group, a halogen-substituted cyclooctenyl group, and halogen-substituted cyclononenyl group, a halogen-substituted cyclodecenyl group, a halogen-substituted butylcyclopentenyl group, and the like. Among these, halogen-substituted cycloalkenyl groups having 3 to 12 carbon atoms are preferable.

Examples of the aromatic hydrocarbon group having 6 to 24 carbon atoms represented by $R^1$ and $R^2$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like. Among these, aromatic hydrocarbon groups having 6 to 12 carbon atoms are preferable.

Examples of the halogen-substituted aromatic hydrocarbon group having 6 to 24 carbon atoms represented by $R^1$ and $R^2$ include a phenyl halide group, a methylphenyl halide group, a methylphenyl trihalide group, a benzyl perhalide group, a phenyl perhalide group, a 2-phenyl-2-halogenated ethyl group, a naphthyl perhalide group, a 4-phenyl-2,3-dihalogenated butyl group, and the like. Among these, halogen-substituted aromatic hydrocarbon groups having 6 to 12 carbon atoms are preferable.

Examples of the halogen included in the halogen-substituted alkyl group, the halogen-substituted alkenyl group, the halogen-substituted cycloalkyl group, the halogen-substituted cycloalkenyl group, and the halogen-substituted aromatic hydrocarbon group represented by $R^1$ and $R^2$ include fluorine, chlorine, bromine, and iodine. Among these, fluorine, chlorine, and bromine are preferable.

Examples of the nitrogen atom-containing hydrocarbon group having 2 to 24 carbon atoms that is terminated by a carbon atom (excluding a group that is terminated by a C=N group) represented by $R^1$ and $R^2$ include alkylaminoalkyl groups such as a methylaminomethyl group, a dimethylaminomethyl group, a ethylaminomethyl group, a diethylaminomethyl group, a propylaminomethyl group, a dipropylaminomethyl group, a methylaminoethyl group, a dimethylaminoethyl group, a ethylaminoethyl group, a diethylaminoethyl group, a propylaminoethyl group, a dipropylaminoethyl group, a butylaminoethyl group, a dibutylaminoethyl group, a pentylaminoethyl group, a dipentylaminoethyl group, a hexylaminoethyl group, a hexylmethylaminoethyl group, a heptylmethylaminoethyl group, a diheptylaminomethyl group, a octylmethylaminomethyl group, a dioctylaminoethyl group, a nonylaminomethyl group, a dinonylaminomethyl group, a decylaminomethyl group, a didecylaminomethyl group, a cyclohexylaminomethyl group, and a dicyclohexylaminomethyl group; arylaminoalkyl groups and alkylarylaminoalkyl groups such as a phenylaminomethyl group, a diphenylaminomethyl group, a ditolylaminomethyl group, a dinaphthylaminomethyl group, and a methylphenylaminoethyl group; polycyclic aminoalkyl groups; amino group-containing aromatic hydrocarbon groups such as an anilino group, a dimethylaminophenyl group, and a bisdimethylaminophenyl group; iminoalkyl groups such as a methyliminomethyl group, an ethyliminoethyl group, a propyliminomethyl group, a butyliminomethyl group, and a phenyliminomethyl group; and the like. Among these, nitrogen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the oxygen atom-containing hydrocarbon group having 2 to 24 carbon atoms that is terminated by a carbon atom (excluding a group that is terminated by a C=O group) represented by $R^1$ and $R^2$ include ether group-containing hydrocarbon groups such as a methoxymethyl group, an ethoxymethyl group, a propoxymethyl group, a butoxymethyl group, an isopropoxymethyl group, an isobutoxymethyl group, a methoxyethyl group, an ethoxyethyl group, a propoxyethyl group, a butoxyethyl group, an isopropoxyethyl group, and an isobutoxyethyl group; aryloxyalkyl groups such as a phenoxymethyl group, a methylphenoxymethyl group, a dimethylphenoxymethyl group, and a naphthoxymethyl group; alkoxyaryl groups such as a methoxyphenyl group and an ethoxyphenyl group; an acetoxymethyl group; and the like. Among these, oxygen atom-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the phosphorus-containing hydrocarbon group having 2 to 24 carbon atoms that is terminated by a carbon atom (excluding a group that is terminated by a C=P group) represented by $R^1$ and $R^2$ include dialkylphosphinoalkyl groups such as a dimethylphosphinomethyl group, a dibutylphosphinomethyl group, a dicyclohexylphosphinomethyl group, a dimethylphosphinoethyl group, a dibutylphosphinoethyl group, and a dicyclohexylphosphinoethyl group; diarylphosphinoalkyl groups such as a diphenylphosphinomethyl group and a ditolylphosphinomethyl group; phosphino group-substituted aryl groups such as a dimethylphosphinophenyl group and a diethylphosphinophenyl group; and the like. Among these, phosphorus-containing hydrocarbon groups having 2 to 12 carbon atoms are preferable. Note that the expression "terminated by" used herein in connection with $R^1$ and $R^2$ means that $R^1$ or $R^2$ is bonded to the adjacent oxygen atom through an atom or a group by which $R^1$ or $R^2$ is terminated.

Examples of the silicon-containing hydrocarbon group having 1 to 24 carbon atoms represented by $R^1$ and $R^2$ include a hydrocarbon-substituted silyl group, a hydrocarbon-substituted siloxyalkyl group, a hydrocarbon-substituted silylalkyl group, a hydrocarbon-substituted silylaryl group, and the like. Specific examples of the silicon-containing hydrocarbon group having 1 to 24 carbon atoms include hydrocarbon-substituted silyl groups such as a phenylsilyl group, a diphenylsilyl group, a trimethylsilyl group, a triethylsilyl group, a tripropylsilyl group, a tricyclohexylsilyl group, a triphenylsilyl group, a methyldiphenylsilyl group, a tritolylsilyl group, and a trinaphthylsilyl group; siloxy hydrocarbon groups such as a trimethylsiloxymethyl group, a trimethylsiloxyethyl group, and a trimethylsiloxyphenyl group; hydrocarbon-substituted silyl ether groups such as a trimethyl silyl ether group; silicon-substituted alkyl groups such as a trimethylsilylmethyl group; silicon-substitution aryl groups such as a trimethylsilylphenyl group; and the like. Among these, silicon-containing hydrocarbon groups having 1 to 12 carbon atoms are preferable.

R¹ is preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms. R¹ is more preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms. R¹ is particularly preferably a linear alkyl group having 1 to 12 carbon atoms, a branched alkyl group having 3 to 12 carbon atoms, or an aromatic hydrocarbon group having 6 to 12 carbon atoms.

R² is preferably a linear alkyl group having 1 to 12 carbon atoms, a branched alkyl group having 3 to 12 carbon atoms that is terminated by —CH₂—, a vinyl group, a linear alkenyl group having 3 to 12 carbon atoms, a branched alkenyl group having 3 to 12 carbon atoms that is terminated by —CH₂—, a linear halogen-substituted alkyl group having 1 to 12 carbon atoms, a branched halogen-substituted alkyl group having 3 to 12 carbon atoms that is terminated by —CH₂—, a linear halogen-substituted alkenyl group having 3 to 12 carbon atoms, a branched halogen-substituted alkenyl group having 3 to 12 carbon atoms that is terminated by —CH₂—, a cycloalkyl group having 4 to 12 carbon atoms that is terminated by —CH₂—, a cycloalkenyl group having 4 to 12 carbon atoms that is terminated by —CH₂—, a halogen-substituted cycloalkyl group having 4 to 12 carbon atoms that is terminated by —CH₂—, a halogen-substituted cycloalkenyl group having 4 to 12 carbon atoms that is terminated by —CH₂—, or an aromatic hydrocarbon group having 7 to 12 carbon atoms that is terminated by —CH₂—. R² is more preferably a linear alkyl group having 1 to 12 carbon atoms, a branched alkyl group having 3 to 12 carbon atoms that is terminated by —CH₂—, a branched alkenyl group having 3 to 12 carbon atoms that is terminated by —CH₂—, a linear halogen-substituted alkyl group having 1 to 12 carbon atoms that is terminated by —CH₂—, a branched halogen-substituted alkenyl group having 3 to 12 carbon atoms that is terminated by —CH₂—, a cycloalkyl group having 4 to 12 carbon atoms that is terminated by —CH₂—, a cycloalkenyl group having 4 to 12 carbon atoms that is terminated by —CH₂—, a halogen-substituted cycloalkyl group having 4 to 12 carbon atoms that is terminated by —CH₂—, a halogen-substituted cycloalkenyl group having 4 to 12 carbon atoms that is terminated by —CH₂—, or an aromatic hydrocarbon group having 7 to 12 carbon atoms that is terminated by —CH₂—. R² is particularly preferably a linear hydrocarbon group having 1 to 12 carbon atoms, a branched alkyl group having 3 to 12 carbon atoms that is terminated by —CH₂—, or an aromatic hydrocarbon group having 7 to 12 carbon atoms that is terminated by —CH₂—. Note that the expression "terminated by" used herein in connection with R² means that R² is bonded to the adjacent oxygen atom through an atom or a group by which R² is terminated.

Z in the general formula (1) is a divalent linking group that bonds the carbonate group and the ether group (OR²). The two oxygen atoms bonded to Z (i.e., bonded through Z) are preferably bonded through a carbon chain. The carbon chain preferably includes two carbon atoms. When Z is a cyclic group (e.g., cycloalkylene group, cycloalkenylene group, halogen-substituted cycloalkylene group, halogen-substituted cycloalkenylene group, aromatic hydrocarbon group, or halogen-substituted aromatic hydrocarbon group), the two oxygen atoms bonded to Z may be bonded through two carbon atoms that form the cyclic group.

Z is preferably a linear alkylene group having 1 to 20 carbon atoms, a branched alkylene group having 3 to 20 carbon atoms, a vinylene group, a linear or branched alkenylene group having 3 to 20 carbon atoms, a linear halogen-substituted alkylene group having 1 to 20 carbon atoms, a branched halogen-substituted alkylene group having 3 to 20 carbon atoms, a linear or branched halogen-substituted alkenylene group having 3 to 20 carbon atoms, a cycloalkylene group having 3 to 20 carbon atoms, a cycloalkenylene group having 3 to 20 carbon atoms, a halogen-substituted cycloalkylene group having 3 to 20 carbon atoms, a halogen-substituted cycloalkenylene group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 1 to 24 carbon atoms, an oxygen atom-containing hydrocarbon group having 1 to 24 carbon atoms, a phosphorus-containing hydrocarbon group having 1 to 24 carbon atoms, or a silicon-containing hydrocarbon group having 1 to 24 carbon atoms.

Z is more preferably an ethylene group, a branched alkylene group having 3 to 12 carbon atoms, a vinylene group, a linear or branched alkenylene group having 3 to 12 carbon atoms, a linear halogen-substituted alkylene group having 2 to 12 carbon atoms, a branched halogen-substituted alkylene group having 3 to 12 carbon atoms, a linear or branched halogen-substituted alkenylene group having 3 to 12 carbon atoms, a cycloalkylene group having 3 to 12 carbon atoms, a cycloalkenylene group having 3 to 12 carbon atoms, a halogen-substituted cycloalkylene group having 3 to 12 carbon atoms, a halogen-substituted cycloalkenylene group having 3 to 12 carbon atoms, an aromatic hydrocarbon group having 6 to 12 carbon atoms, a halogen-substituted aromatic hydrocarbon group having 6 to 12 carbon atoms, a nitrogen atom-containing hydrocarbon group having 2 to 12 carbon atoms, an oxygen atom-containing hydrocarbon group having 2 to 12 carbon atoms, a phosphorus-containing hydrocarbon group having 2 to 12 carbon atoms, or a silicon-containing hydrocarbon group having 2 to 12 carbon atoms. Z is particularly preferably a bidentate linking group selected from an ethylene group and a branched alkylene group having 3 to 12 carbon atoms. Note that the term "bidentate linking group" means that two oxygen atoms bonded to Z are bonded through a carbon chain, and the carbon chain includes two carbon atoms.

Examples of the linear alkylene group having 1 to 20 carbon atoms represented by Z include an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, and the like. Among these, linear alkylene groups having 2 to 12 carbon atoms are preferable. An ethylene group is still more preferable.

Examples of the branched alkylene group having 3 to 20 carbon atoms represented by Z include a 1-methylethylene group, a 2-methyltrimethylene group, a 2-methyltetramethylene group, a 2-methylpentamethylene group, a 3-methylhexamethylene group, a 4-methylheptamethylene group, a 4-methyloctamethylene group, a 5-methylnonamethylene group, a 5-methyldecamethylene group, a 6-methylundecamethylene group, a 7-methyldodecamethylene group, a 7-methyltridecamethylene group, and the like. Among these, branched alkylene groups having 3 to 12 carbon atoms are preferable. A 1-methylethylene group, a 2-methylethylene group, and a 1-ethylethylene group are more preferable.

Examples of the linear alkenylene group having 3 to 20 carbon atoms represented by Z include a propenylene group, a butenylene group, a hexenylene group, an octenylene group, an octadecenylene group, and the like. Among these, linear alkenylene groups having 3 to 12 carbon atoms are preferable.

Examples of the branched alkenylene group having 3 to 20 carbon atoms represented by Z include an isopropenylene group, a 1-ethylethenylene group, a 2-methylpropenylene group, a 2,2-dimethylbutenylene group, a 3-methyl-2-butenylene group, a 3-ethyl-2-butenylene group, a 2-methyloctenylene group, a 2,4-dimethyl-2-butenylene group, and the like. Among these, branched alkenylene groups having 3 to 12 carbon atoms that include an ethenylene group are preferable. An isopropenylene group and a 1-ethylethenylene group are more preferable.

Examples of the linear halogen-substituted alkylene group having 1 to 20 carbon atoms represented by Z include a dichloromethylene group, a chloromethylene group, a dichloromethylene group, a tetrachloroethylene group, and the like. Among these, linear halogen-substituted alkylene groups having 3 to 12 carbon atoms are preferable. A chloroethylene group, a fluoroethylene group, a dichloroethylene group, a difluoroethylene group, and a tetrafluoroethylene group are more preferable.

Examples of the branched halogen-substituted alkylene group having 1 to 20 carbon atoms represented by Z include a 1,2-bischloromethylethylene group, a 2,2-bis(chloromethyl)propylene group, a 1,2-bisdichloromethylethylene group, a 1,2-bis(trichloromethypethylene group, a 2,2-dichloropropylene group, a 1,1,2,2-tetrachloroethylene group, a 1-trifluoromethylethylene group, a 1-pentafluorophenylethylene group, and the like. Among these, branched halogen-substituted alkylene groups having 3 to 12 carbon atoms are preferable. A 1-chloroethylethylene group, a 1-trifluoromethylethylene group, and a 1,2-bis(chloromethyl)ethylene group are more preferable.

Examples of the linear halogen-substituted alkenylene group having 1 to 20 carbon atoms represented by Z include a dichloroethenylene group, a difluoroethenylene group, a 3,3-dichloropropenylene group, a 1,2-difluoropropenylene group, and the like. Among these, linear halogen-substituted alkenylene groups having 3 to 12 carbon atoms are preferable. A dichloroethenylene group and a difluoroethenylene group are more preferable.

Examples of the branched halogen-substituted alkenylene group having 1 to 20 carbon atoms represented by Z include a 3,4-dichloro-1,2-butylene group, 2,2-dichloro-1,3-butylene group, a 1,2-difluoro-1,2-propylene group, and the like. Among these, branched halogen-substituted alkylene groups having 3 to 12 carbon atoms are preferable. A chloromethylethenylene group, a trifluoromethylethenylene group, and a 3,4-dichloro-1,2-butenylene group are more preferable.

Examples of the cycloalkylene group having 3 to 20 carbon atoms represented by Z include a cyclopentylene group, a cyclohexylene group, a cyclopropylene group, a 2-methylcyclopropylene group, a cyclobutylene group, a 2,2-dimethylcyclobutylene group, a 2,3-dimethylcyclopentylene group, a 1,3,3-trimethylcyclohexylene group, a cyclooctylene group, and the like. Among these, cycloalkylene groups having 3 to 12 carbon atoms are preferable. A 1,2-cycloalkylene group and a hydrocarbon group-substituted 1,2-cycloalkylene group are more preferable.

Examples of the cycloalkenylene group having 3 to 20 carbon atoms represented by Z include a cyclopentenylene group, a 2,4-cyclopentadienylene group, a cyclohexenylene group, a 1,4-cyclohexadienylene group, a cycloheptenylene group, a methylcyclopentenylene group, a methylcyclohexenylene group, a methylcycloheptenylene group, a dicyclodecylene group, a tricyclodecylene group, and the like. Among these, cycloalkenylene groups having 3 to 12 carbon atoms are preferable. A 1,2-cycloalkenylene group and a hydrocarbon group-substituted 1,2-cycloalkenylene group are more preferable.

Examples of the halogen-substituted cycloalkylene group having 3 to 20 carbon atoms represented by Z include a 3-chloro-1,2-cyclopentylene group, a 3,4,5,6-tetrachloro-1,2-cyclohexylene group, a 3,3-dichloro-1,2-cyclopropylene group, a 2-chloromethylcyclopropylene group, a 3,4-dichloro-1,2-cyclobutylene group, a 3,3-bis(dichloromethyl)-1,2-cyclobutylene group, a 2,3-bis(dichloromethyl)cyclopentylene group, a 1,3,3-tris(fluoromethyl)-1,2-cyclohexylene group, a 3-trichloromethyl-1,2-cyclooctylene group, and the like. Among these, halogen-substituted cycloalkylene groups having 3 to 12 carbon atoms are preferable.

Examples of the halogen-substituted cycloalkenylene group having 3 to 20 carbon atoms represented by Z include a 5-chloro-1,2-cyclo-4-hexenylene group, a 3,3,4,4-tetrafluoro-1,2-cyclo-6-octenylene group, and the like. Among these, halogen-substituted cycloalkenylene groups having 3 to 12 carbon atoms are preferable.

Examples of the aromatic hydrocarbon group having 6 to 24 carbon atoms represented by Z include a 1,2-phenylene group, a 3-methyl-1,2-phenylene group, a 3,6-dimethyl-1,2-phenylene group, a 1,2-naphthylene group, a 2,3-naphthylene group, a 5-methyl-1,2-naphthylene group, a 9,10-phenanthrylene group, a 1,2-anthracenylene group, and the like. Among these, aromatic hydrocarbon groups having 6 to 12 carbon atoms are preferable.

Examples of the halogen-substituted aromatic hydrocarbon group having 6 to 24 carbon atoms represented by Z include a 3-chloro-1,2-phenylene group, a 3-chloromethyl-1,2-phenylene group, a 3,6-dichloro-1,2-phenylene group, a 3,6-dichloro-4,5-dimethyl-1,2-phenylene group, a 3-chloro-1,2-naphthylene group, a 3-fluoro-1,2-naphthylene group, a 3,6-dichloro-1,2-phenylene group, a 3,6-difluoro-1,2-phenylene group, a 3,6-dibromo-1,2-phenylene group, a 1-chloro-2,3-naphthylene group, a 5-chloro-1,2-naphthylene group, a 2,6-dichloro-9,10-phenanthrylene group, a 5,6-dichloro-1,2-anthracenylene group, a 5,6-difluoro-1,2-anthracenylene, and the like. Among these, halogen-substituted aromatic hydrocarbon groups having 6 to 12 carbon atoms are preferable.

Examples of the nitrogen atom-containing hydrocarbon group having 1 to 24 carbon atoms represented by Z include a 1-dimethylaminoethylene group, a 1,2-bisdimethylaminoethylene group, a 1-diethylaminoethylene group, a 2-diethylamino-1,3-propylene group, a 2-ethylamino-1,3-propylene group, a 4-dimethylamino-1,2-phenylene group, a 4,5-bis(dimethylamino)phenylene group, and the like. Among these, nitrogen atom-containing hydrocarbon groups having 2 to 12 carbon atoms are preferable.

Examples of the oxygen atom-containing hydrocarbon group having 1 to 24 carbon atoms represented by Z include a 1-methoxyethylene group, a 2,2-dimethoxy-1,3-propanylene group, a 2-ethoxy-1,3-propanylene group, a 2-t-butoxy-1,3-propanylene group, a 2,3-dimethoxy-2,3-butylene group, a 4-methoxy-1,2-phenylene group, and the like. Among these, oxygen atom-containing hydrocarbon groups having 2 to 12 carbon atoms are preferable.

Examples of the phosphorus-containing hydrocarbon group having 1 to 24 carbon atoms represented by Z include a 1-dimethylphosphinoethylene group, a 2,2-bis(dimethylphosphino)-1,3-propanylene group, a 2-diethylphosphino-1,3-propanylene group, a 2-t-butoxymethylphosphino-1,3-propanylene group, a 2,3-bis(diphenylphospino)-2,3-butylene group, a 4-methylphosphate-1,2-phenylene group, and the like. Among these, phosphorus-containing hydrocarbon groups having 1 to 12 carbon atoms are preferable.

Examples of the silicon-containing hydrocarbon group having 1 to 24 carbon atoms represented by Z include a trimethylsilylethylene group, a 1,2-bis(trimethylsilyl)ethylene group, a 1,2-bis(trimethylsiloxy)ethylene group, a 2,2-bis(4-trimethylsilylphenyl)-1,3-propanylene group, a 1,2-bis(monomethylsilane)ethylene group, and the like. Among these, silicon-containing hydrocarbon groups having 1 to 12 carbon atoms are preferable.

The compound represented by the general formula (1) preferably includes a group among the groups preferable as $R^1$, a group among the groups preferable as Z, and a group among the groups preferable as $R^2$, and more preferably includes a group among the groups particularly preferable as $R^1$, a group among the groups particularly preferable as Z, and a group among the groups particularly preferable as $R^2$. Z is more preferably a linking group in which the carbon chain that links the two oxygen atoms includes two carbon atoms, and particularly preferably a linking group in which the carbon chain that links the two oxygen atoms is an alkyl chain having two carbon atoms.

The electron donor compound represented by the general formula (1) is an ether carbonate compound that includes one ether group and one carbonate group. The carbonyl oxygen atom of the carbonate group having a high coordination capability and the ether oxygen atom of the ether group having a low coordination capability are controlled at an appropriate distance in an appropriate coordination direction through the carbon linking group, and selectively coordinated to an appropriate site on the magnesium compound, so that the titanium halide that serves as an active site is supported at an appropriate position. Therefore, the support position of the titanium compound that forms an active site is restricted, and a large number of titanium active sites that ensure stereoregularity and high activity can be selectively formed. The ether oxygen atom of the ether group is easily removed from the coordination site due to low coordination capability. Therefore, the titanium active site is provided with a moderate degree of freedom, and a situation in which the molecular weight distribution unnecessarily becomes narrow is prevented. Since the solid catalyst component (I) includes the ether carbonate compound represented by the general formula (1) as an electron donor compound, an olefin polymer having a moderate molecular weight distribution can be obtained in high yield.

The positional relationship between the ether group and the carbonate group, and the degree of coordination capability of the ether group and the carbonate group are important in order to cause the compound represented by the general formula (1) to be coordinated to a specific site of the magnesium compound. When Z is a group among the groups that are more preferable or particularly preferable as Z, the positional relationship between the ether group and the carbonate group can be improved. $R^1$ and $R^2$ in the general formula (1) are not strictly limited as compared with Z, and various hydrocarbon groups may be used as $R^1$ and $R^2$. Specifically, $R^1$ and $R^2$ are not particularly limited as to the size (number of carbons), the presence or absence of an unsaturated bond, and the presence or absence of a halogen group as long as $R^1$ and $R^2$ do not have a three-dimensional structure that inhibits coordination of the carbonyl oxygen atom and the ether oxygen atom (i.e., do not adversely affect the advantageous effects of the invention), and are selected to control stereoregularity, activity, and the molecular weight distribution within an appropriate range even if an electronic or steric effect is achieved to some extent. For example, a compound in which some of the carbon atoms and the hydrogen atoms of the carbon chain of $R^1$ and $R^2$ are substituted with a halogen atom to form a halogen-substituted hydrocarbon group may suitably be used as the electron donor compound included in the solid catalyst component for olefin polymerization according to one embodiment of the invention. Note that it is preferable that $R^2$ be terminated by —$CH_2$— in order to facilitate coordination of the ether oxygen atom.

Specific examples of a preferable component (A) represented by the general formula (1) include 2-methoxyethylmethyl carbonate, 2-ethoxyethylmethyl carbonate, 2-propoxyethylmethyl carbonate, 2-(2-ethoxyethyloxy)ethylmethyl carbonate, 2-benzyloxyethylmethyl carbonate, (2-methoxypropyl)methyl carbonate, 2-ethoxypropylmethyl carbonate, 2-methyl(2-methoxy)butylmethyl carbonate, 2-methyl(2-ethoxy)butylmethyl carbonate, 2-methyl(2-methoxy)pentylmethyl carbonate, 2-methyl(2-ethoxy)pentylmethyl carbonate, 1-phenyl(2-methoxy)propyl carbonate, 1-phenyl(2-ethoxy)propylmethyl carbonate, 1-phenyl(2-benzyloxy)propylmethyl carbonate, 1-phenyl(2-methoxy)ethylmethyl carbonate, 1-phenyl(2-ethoxy)ethylmethyl carbonate, 1-methyl-1-phenyl(2-methoxy)ethylmethyl carbonate, 1-methyl-1-phenyl(2-ethoxy)ethylmethyl carbonate, 1-methyl-1-phenyl(2-benzyloxy)ethylmethyl carbonate, 1-methyl-1-phenyl (2-(2-ethoxyethyloxy))ethylmethyl carbonate, 2-methoxyethyl-ethyl carbonate, 2-ethoxyethyl-ethyl carbonate, 1-phenyl(2-methoxy)ethyl-ethyl carbonate, 1-phenyl (2-ethoxy)ethyl-ethyl carbonate, 1-phenyl(2-propoxy)ethyl-ethyl carbonate, 1-phenyl(2-butoxy)ethyl-ethyl carbonate, 1-phenyl(2-isobutyloxy)ethyl-ethyl carbonate, 1-phenyl(2-(2-ethoxyethyloxy))ethyl-ethyl carbonate, 1-methyl-1-phenyl(2-methoxy)ethyl-ethyl carbonate, 1-methyl-1-phenyl(2-ethoxy)ethyl-ethyl carbonate, 1-methyl-1-phenyl(2-propoxy)ethyl-ethyl carbonate, 1-methyl-1-phenyl(2-butoxy)ethyl-ethyl carbonate, 1-methyl-1-phenyl(2-isobutyloxy)ethyl-ethyl carbonate, 1-methyl-1-phenyl(2-benzyloxy)ethyl-ethyl carbonate, 1-methyl-1-phenyl(2-(2-ethoxyethyloxy))ethyl-ethyl carbonate, 2-methoxyethylphenyl carbonate, 2-ethoxyethylphenyl carbonate, 2-propoxyethylphenyl carbonate, 2-butoxyethylphenyl carbonate, 2-isobutyloxyethylphenyl carbonate, 2-benzyloxyethylphenyl carbonate, 2-(2-ethoxyethyloxy)ethylphenyl carbonate, 2-methoxyethyl-p-methylphenyl carbonate, 2-ethoxyethyl-p-methylphenyl carbonate, 2-propoxyethyl-p-methylphenyl carbonate, 2-butoxyethyl-p-methylphenyl carbonate, 2-isobutyloxyethyl-p-methylphenyl carbonate, 2-benzyloxyethyl-p-methylphenyl carbonate, 2-(2-ethoxyethyloxy)ethyl-p-methylphenyl carbonate, 2-methoxyethyl-o-methylphenyl carbonate, 2-ethoxyethyl-o-methylphenyl carbonate, 2-propoxyethyl-o-methylphenyl carbonate, 2-butoxyethyl-o-methylphenyl carbonate, 2-isobutyloxyethyl-o-methylphenyl carbonate, 2-benzyloxyethyl-o-methylphenyl carbonate, 2-(2-ethoxyethyloxy)ethyl-o-methylphenyl carbonate, 2-methoxyethyl-o,p-dimethylphenyl carbonate, 2-ethoxyethyl-o,p-dimethylphenyl carbonate, 2-propoxyethyl-o,p-dimethylphenyl carbonate, 2-butoxyethyl-o,p-dimethylphenyl carbonate, 2-isobutyloxyethyl-o,p-dimethylphenyl carbonate, 2-benzyloxyethyl-o,p-dimethylphenyl carbonate, 2-(2-ethoxyethyloxy)ethyl-o,p-dimethylphenyl carbonate, 2-methoxypropylphenyl carbonate, 2-ethoxypropylphenyl carbonate, 2-propoxypropylphenyl carbonate, 2-butoxypropylphenyl carbonate, 2-isobutyloxypropylphenyl carbonate, 2-(2-ethoxyethyloxy)propylphenyl carbonate, 2-phenyl(2-methoxy)ethylphenyl carbonate, 2-phenyl(2-ethoxy)ethylphenyl carbonate, 2-phenyl(2-propoxy)ethylphenyl carbonate, 2-phenyl(2-butoxy)ethylphenyl carbonate, 2-phenyl(2-isobutyloxy)ethylphenyl carbonate, 2-phenyl(2-(2-ethoxyethyloxy))ethylphenyl carbonate, 1-phenyl(2-methoxy)propylphenyl carbonate, 1-phenyl(2-ethoxy)propylphenyl carbonate, 1-phenyl(2-propoxy)propylphenyl carbonate, 1-phenyl(2-isobutyloxy)propylphenyl carbonate, 1-phenyl(2-methoxy)ethylphenyl carbonate, 1-phenyl(2-ethoxy)ethylphenyl carbonate, 1-phenyl(2-propoxy)ethylphenyl carbonate, 1-phenyl(2-butoxy)ethylphenyl carbonate, 1-phenyl(2-isobutyloxy)ethylphenyl carbonate, 1-phenyl(2-(2-ethoxyethyloxy))ethylphenyl carbonate, 1-methyl-1-phenyl(2-methoxy)ethylphenyl carbonate, 1-methyl-1-phenyl(2-ethoxy)ethylphenyl carbonate, 1-methyl-1-phenyl(2-propoxy)ethylphenyl carbonate, 1-methyl-1-phenyl(2-butoxy)ethylphenyl carbonate, 1-methyl-1-phenyl(2-isobutyloxy)ethylphenyl carbonate, 1-methyl-1-phenyl(2-benzyloxy)ethylphenyl carbonate, 1-methyl-1-phenyl(2-(2-ethoxyethyloxy))ethylphenyl carbonate, and the like. The compounds represented by the general formula (1) may be used either alone or in combination.

The solid catalyst component (I) may include an electron donor compound other than the component (A) represented by the general formula (1) (hereinafter may be referred to as "component (D)" or "electron donor compound (D)"). Examples of the electron donor compound (D) include acid halides, acid amides, nitriles, acid anhydrides, diether compounds, organic acid esters, and the like. It is preferable to use a solid catalyst component prepared using the component (A) and the component (D) selected from carboxylic diesters such as succinic diesters, cycloalkanedicarboxylic diesters, cycloalkenedicarboxylic diesters, malonic diesters, hydrocarbon-substituted malonic diesters, and maleic diesters, substituted carboxylic diesters, compounds that include an ester group and an ether group, and diether compounds, since the polymerization activity of the solid catalyst component and the stereoregularity of the resulting olefin polymer can be improved, and the molecular weight and the molecular weight distribution can be controlled within the desired range. Malonic diesters such as dimethyl malonate and diethyl malonate, hydrocarbon-substituted malonic diesters such as dimethyl diisobutylmalonate, diethyl diisobutylmalonate, and diethyl benzylidenemalonate, maleic diesters such as diethyl maleate and di-n-butyl maleate, cycloalkanedicarboxylic diesters such as dimethyl cyclohexane-1,2-dicarboxylate, and 1,3-diethers such as 9,9-bis(methoxymethyl)fluorene are particularly preferable as the component (D). These components (D) may be used in combination.

The solid catalyst component (I) may include a polysiloxane (hereinafter may be referred to as "component (E)"). The stereoregularity or the crystallinity of the resulting polymer can be improved, and production of a fine powder can be reduced by utilizing the polysiloxane. A polysiloxane is a polymer that includes a siloxane linkage (—Si—O—) in the main chain, and is also referred to as "silicone oil". The solid catalyst component (I) may include a chain-like, partially hydrogenated, cyclic, or modified polysiloxane that is liquid or viscous at room temperature, and has a viscosity at 25° C. of 0.02 to 100 cm²/s (2 to 10,000 cSt), and preferably 0.03 to 5 cm²/s (3 to 500 cSt).

Examples of the chain-like polysiloxane include dimethylpolysiloxane and methylphenylpolysiloxane. Examples of the partially hydrogenated polysiloxane include methyl hydrogen polysiloxanes having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, and the like.

The content of titanium, magnesium, the halogen, and the component (A) in the solid catalyst component (I) is not particularly limited. The content of titanium in the solid catalyst component (I) is 0.1 to 10 wt %, preferably 0.5 to 8.0 wt %, and more preferably 1.0 to 8.0 wt %. The content of magnesium in the solid catalyst component (I) is 10 to 40 wt %, preferably 10 to 30 wt %, and more preferably 13 to 25 wt %. The content of the halogen in the solid catalyst component (I) is 20 to 89 wt %, preferably 30 to 85 wt %, and more preferably 40 to 75 wt %. The content of the component (A) (when the component (I) does not include the electron donor compound (D)), or the total content of the component (A) and the electron donor compound (D) (when the component (I) includes the electron donor compound (D)) is 0.5 to 40 wt %, preferably 1 to 30 wt %, and more preferably 2 to 25 wt %. When the component (I) includes the electron donor compound (D), the ratio of the content of the electron donor compound (D) to the content of the component (A) is 0.01 to 50, preferably 0.1 to 10, and more preferably 0.2 to 5 (molar basis).

The solid catalyst component (I) may include a reagent that includes silicon, phosphorus, or a metal (e.g., aluminum) in addition to the above components. Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component and the stereoregularity of the resulting polymer can be improved.

Examples and specific examples of the organosilicon compound that includes an Si—O—C linkage and the organosilicon compound that includes an Si—N—C linkage include those mentioned later in connection with the organosilicon compound represented by the general formula (3) and the organosilicon compound represented by the general formula (4). Examples of the organoaluminum compound include those mentioned later in connection with the organoaluminum compound represented by the general formula (2). These reagents may be used either alone or in combination.

The solid catalyst component (I) that includes the reagent may further include an organosilicon compound represented by the following general formula (7) that includes an unsaturated alkyl group.

   (7)

wherein $R^{14}$ is a hydrogen atom, an alkyl group having 1 to 20 carbon atoms, a cycloalkyl group, a phenyl group, a vinyl group, or a halogen atom, provided that a plurality of $R^{14}$ are either identical or different when a plurality of $R^{14}$ are present, u is an integer from 0 to 5, and t is an integer from 1 to 4. In this case, the polymerization activity of the resulting solid catalyst component and the hydrogen response can be further improved.

The unsaturated alkyl group refers to a vinyl group or an alkenyl group. Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenyldimethylsilane, diallyldichlorosilane, and allyltriethylsilane are particularly preferable. These organosilicon compounds that include an unsaturated alkyl group may be used either alone or in combination.

Method for Producing Solid Catalyst Component (I)

The solid catalyst component (I) according to one embodiment of the invention is produced by bringing a magnesium compound, a titanium compound, an optional halogen compound other than the titanium compound, and the compound (A) represented by the general formula (1) into contact with each other.

Examples of the magnesium compound (hereinafter referred to as "component (B)" or "magnesium compound (B)") used to produce the solid catalyst component according to one embodiment of the invention include one or more magnesium compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be prepared by reacting magnesium metal with an alcohol in the presence of a halogen, a halogen-containing metal compound, or the like. The above dialkoxymagnesiums may be used either alone or in combination.

It is preferable to use a granular or powdery dialkoxymagnesium when producing the solid catalyst component according to one embodiment of the invention. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by fine particles contained in the polymer powder.

The spherical dialkoxymagnesium need not necessarily have a perfect spherical shape, but may have an elliptical shape or a potato-like shape. The ratio (l/w) of the major axis diameter (l) to the minor axis diameter (w) of the spherical dialkoxymagnesium is 3 or less, preferably 1 to 2, and more preferably 1 to 1.5.

The average particle size D50 (i.e., the particle size at 50% in the cumulative volume particle size distribution) of the dialkoxymagnesium measured using a laser diffraction/scattering particle size distribution analyzer is preferably 1 to 200 μm, and more preferably 5 to 150 μm. The average particle size of the spherical dialkoxymagnesium is preferably 1 to 100 μm, more preferably 5 to 50 μm, and still more preferably 10 to 40 μm. It is preferable that the spherical dialkoxymagnesium have a narrow particle size distribution, and have a low fine particle content and a low coarse particle content. More specifically, it is preferable that the content of particles having a particle size (measured using a laser diffraction/scattering particle size distribution analyzer) of 5 μm or less in the spherical dialkoxymagnesium be 20% or less, and more preferably 10% or less. It is preferable that the content of particles having a particle size of 100 μm or more in the spherical dialkoxymagnesium be 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

The magnesium compound (B) may be used in the form of a magnesium compound solution or a magnesium compound suspension. When the magnesium compound (B) is solid, the magnesium compound (B) is dissolved in a solvent that can dissolve the magnesium compound (B) to prepare a magnesium compound solution, or suspended in a solvent that cannot dissolve the magnesium compound (B) to prepare a magnesium compound suspension. When the magnesium compound (B) is liquid, the magnesium compound (B) may be used directly as a magnesium compound solution, or may be dissolved in a solvent that can dissolve the magnesium compound (B) to prepare a magnesium compound solution.

Examples of a compound that can dissolve the solid magnesium compound (B) include at least one compound selected from the group consisting of alcohols, ethers, and esters. Specific examples of the compound that can dissolve the solid magnesium compound (B) include alcohols having 1 to 18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol; halogen-containing alcohols having 1 to 18 carbon atoms such as trichloromethanol, trichloroethanol, and trichlorohexanol; ethers having 2 to 20 carbon atoms such as methyl ether, ethyl ether, isopropyl ether, butyl ether, amyl ether, tetrahydrofuran, ethyl benzyl ether, dibutyl ether, anisole, and diphenyl ether; metal acid esters such as tetraethoxytitanium, tetra-n-propoxytitanium, tetraisopropoxytitanium, tetrabutoxytitanium, tetrahexoxytitanium, tetrabutoxyzirconium, and tetraethoxyzirconium; and the like. Among these, alcohols such as ethanol, propanol, butanol, and 2-ethylhexanol are preferable, and 2-ethylhexanol is particularly preferable.

A saturated hydrocarbon solvent or an unsaturated hydrocarbon solvent that does not dissolve a magnesium compound is used as a medium that cannot dissolve the magnesium compound (B). The saturated hydrocarbon solvent or the unsaturated hydrocarbon solvent is safe and has high industrial versatility. Examples of the saturated hydrocarbon solvent or the unsaturated hydrocarbon solvent include linear or branched aliphatic hydrocarbon compounds having a boiling point of 50 to 200° C., such as hexane, heptane, decane, and methylheptane, alicyclic hydrocarbon compounds having a boiling point of 50 to 200° C., such as cyclohexane, ethylcyclohexane, and decahydronaphthalene, and aromatic hydrocarbon compounds having a boiling point of 50 to 200° C., such as toluene, xylene, and ethylbenzene. Among these, linear aliphatic hydrocarbon compounds having a boiling point of 50 to 200° C., such as hexane, heptane, and decane, and aromatic hydrocarbon compounds having a boiling point of 50 to 200° C., such as toluene, xylene, and ethylbenzene are preferable. These solvents may be used either alone or in combination.

Examples of the titanium compound (hereinafter may be referred to as "component (C)" or "titanium compound (C)") used to produce the component (I) according to one embodiment of the invention include a tetravalent titanium compound represented by the following general formula (6).

$$Ti(OR^{13})_j X_{4-j} \quad (6)$$

wherein $R^{13}$ is a hydrocarbon group having 1 to 10 carbon atoms, provided that a plurality of $R^{13}$ are either identical or different when a plurality of $OR^{13}$ are present, X is a halogen atom, provided that a plurality of X are either identical or different when a plurality of X are present, and j is an integer from 0 to 4.

The tetravalent titanium compound represented by the general formula (6) is one compound or two or more compounds selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (6) may be used in a state in which the tetravalent titanium compound is diluted with a hydrocarbon compound, a halogenated hydrocarbon compound, or the like.

A halogen compound other than the titanium compound (C) may optionally be used to produce the solid catalyst component (I) according to one embodiment of the invention. Examples of the halogen compound include tetravalent halogen-containing silicon compounds. Specific examples of the halogen compound include silane tetrahalides such as tetrachlorosilane (silicon tetrachloride) and tetrabromosilane, and alkoxy group-containing halogenated silanes such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

The component (A) used to produce the solid catalyst component (I) according to one embodiment of the invention is the same as the component (A) included in the solid catalyst component (I) according to one embodiment of the invention, and description thereof is omitted. The electron donor compound (D) other than the component (A) that is optionally used to produce the solid catalyst component (I) according to one embodiment of the invention is the same as the electron donor compound (D) that is optionally included in the solid catalyst component (I) according to one embodiment of the invention, and description thereof is omitted. The component (E) that is optionally used to produce the solid catalyst component (I) according to one embodiment of the invention is the same as the component (E) that is optionally included in the solid catalyst component (I) according to one embodiment of the invention, and description thereof is omitted.

The solid catalyst component (I) may preferably be produced by a method that co-grinds a solid magnesium compound that does not have a reducing capability, the component (A), and a titanium halide, a method that brings a magnesium halide compound that includes an alcohol or the like, the component (A), and a titanium halide into contact with each other in the presence of an inert hydrocarbon solvent, a method that brings a dialkoxymagnesium, the component (A), and a titanium halide into contact with each other in the presence of an inert hydrocarbon solvent, a method that brings a magnesium compound having a reducing capability, the component (A), and a titanium halide into contact with each other to precipitate a solid catalyst, or the like.

Specific examples of the method for producing the solid catalyst component (I) are described below. In the following methods (1) to (16), the electron donor compound (D) other than the component (A) may be used in combination with the component (A). The components may be brought into contact with each other in the presence of a reagent (e.g., silicon, phosphorus, or aluminum) and a surfactant.

(1) A magnesium halide is dissolved in an alkoxytitanium compound, and an organosilicon compound is brought into contact with the solution to obtain a solid product. The solid product is reacted with a titanium halide, and the component (A) is reacted with the resulting product to produce the solid catalyst component (I) for olefin polymerization. In this case, the component (I) may be subjected to preliminary polymerization using an organoaluminum compound, an organosilicon compound, and an olefin.

(2) A magnesium halide and an alcohol are reacted to obtain a homogeneous solution, and a carboxylic anhydride is brought into contact with the homogeneous solution. A titanium halide and the component (A) are reacted with the solution to obtain a solid, and a titanium halide is brought into contact with the solid to produce the solid catalyst component (I) for olefin polymerization.

(3) Magnesium metal, butyl chloride, and a dialkyl ether are reacted to synthesize an organomagnesium compound, and an alkoxytitanium is reacted with the organomagnesium compound to obtain a solid product. The component (A) and a titanium halide are reacted with the solid product to produce the solid catalyst component (I). In this case, the solid component may be subjected to preliminary polymerization using an organoaluminum compound, an organosilicon compound, and an olefin to produce the solid catalyst component (I).

(4) An organomagnesium compound such as a dialkylmagnesium and an organoaluminum compound are reacted with an alcohol in the presence of a hydrocarbon solvent to obtain a homogeneous solution, and a silicon compound such as silicon tetrachloride is brought into contact with the solution to obtain a solid product. A titanium halide and the component (A) are reacted with the solid product in the presence of an aromatic hydrocarbon solvent, and titanium tetrachloride is brought into contact with the resulting product to produce the solid catalyst component (I).

(5) Magnesium chloride, a tetraalkoxytitanium, and a fatty alcohol are reacted in the presence of a hydrocarbon solvent to obtain a homogeneous solution, and a titanium halide is brought into contact with the solution. The mixture is then heated to precipitate a solid, and the component (A) is brought into contact with the solid. The mixture is then reacted with a titanium halide to produce the solid catalyst component (I).

(6) A magnesium metal powder, an alkylmonohalogen compound, and iodine are reacted, and a tetraalkoxytitanium, an acid halide, and a fatty alcohol are reacted with the mixture in the presence of a hydrocarbon solvent to obtain a homogeneous solution. After the addition of titanium tetrachloride to the solution, the mixture is heated to precipitate a solid, and the component (A) is brought into contact with the solid. The mixture is then reacted with titanium tetrachloride to produce the solid catalyst component (I).

(7) A dialkoxymagnesium is suspended in a hydrocarbon solvent, and brought into contact with titanium tetrachloride. The mixture is heated, and brought into contact with the component (A) to obtain a solid product. The solid product is washed with a hydrocarbon solvent, and brought into contact with titanium tetrachloride in the presence of a hydrocarbon solvent to produce the solid catalyst component (I). In this case, the solid component may be heated in the presence or absence of a hydrocarbon solvent.

(8) A dialkoxymagnesium is suspended in a hydrocarbon solvent, and brought into contact with a titanium halide and the component (A) to obtain a solid product. The solid product is washed with an inert organic solvent, and brought into contact with a titanium halide in the presence of a hydrocarbon solvent to produce the solid catalyst component (I). In this case, the solid component and a titanium halide may be brought into contact with each other two or more times.

(9) A dialkoxymagnesium, calcium chloride, and an alkoxy group-containing silicon compound are co-ground. The resulting ground solid is suspended in a hydrocarbon solvent, and reacted with a titanium halide and the component (A). A titanium halide is brought into contact with the mixture to produce the solid catalyst component (I).

(10) A dialkoxymagnesium and the component (A) are suspended in a hydrocarbon solvent, and brought into contact (reacted) with a titanium halide to obtain a solid product. The solid product is washed with a hydrocarbon solvent, and brought into contact with a titanium halide in the presence of a hydrocarbon solvent to produce the solid catalyst component (I).

(11) An aliphatic magnesium such as magnesium stearate is reacted with a titanium halide and the component (A). A titanium halide is then brought into contact with the mixture to produce the solid catalyst component (I).

(12) A dialkoxymagnesium is suspended in a hydrocarbon solvent, and brought into contact with a titanium halide. The mixture is heated, and reacted with the component (A) to obtain a solid product. The solid product is washed with a hydrocarbon solvent, and brought into contact with a titanium halide in the presence of a hydrocarbon solvent to produce the solid catalyst component (I), wherein aluminum chloride is brought into contact in the suspension/contact step or the contact/reaction step.

(13) A dialkoxymagnesium, 2-ethylhexyl alcohol, and carbon dioxide are reacted in the presence of a hydrocarbon solvent to obtain a homogeneous solution. A titanium halide and the component (A) are reacted with the solution to obtain a solid. The solid is dissolved in tetrahydrofuran, and a solid product is precipitated. A titanium halide is reacted with the solid product (optionally two or more times) to produce the solid catalyst component (I). A silicon compound such as tetrabutoxysilane may be used in the contact step, the contact/reaction step, or the dissolution step.

(14) Magnesium chloride, an organic epoxy compound, and a phosphoric acid compound are suspended in a hydrocarbon solvent, and heated to obtain a homogeneous solution. A carboxylic anhydride and a titanium halide are reacted with the solution to obtain a solid product. The component (A) is reacted with the solid product, and the resulting reaction product is washed with a hydrocarbon solvent. A titanium halide is brought into contact with the reaction product to produce the solid catalyst component (I).

(15) A dialkoxymagnesium, a titanium compound, and the component (A) are reacted in the presence of a hydrocarbon solvent, and a silicon compound such as polysiloxane is reacted with the resulting reaction product. A titanium halide and a metal salt of an organic acid are sequentially reacted with the mixture, and a titanium halide is brought into contact with the mixture to produce the solid catalyst component (I).

(16) A dialkoxymagnesium and the component (A) are suspended in a hydrocarbon solvent. The suspension is heated, and brought into contact with a silicon halide. The mixture is brought into contact with a titanium halide to obtain a solid product. The solid product is washed with a hydrocarbon solvent, and brought into contact with a titanium halide in the presence of a hydrocarbon solvent to produce the solid catalyst component (I). In this case, the solid component may be heated in the presence or absence of a hydrocarbon solvent.

When using the methods (1) to (16), a titanium halide and a hydrocarbon solvent may be brought into contact with the washed solid catalyst component (1) at 20 to 100° C., the mixture may be heated to effect a reaction (secondary reaction), and washed with an inert organic solvent that is liquid at room temperature, and the above operation may be repeated 1 to 10 times in order to further improve the polymerization activity when polymerizing the olefin and the stereoregularity of the resulting polymer.

The component (I) according to one embodiment of the invention may suitably be produced using any of the methods (1) to (16). It is preferable to use the method (1), (3), (4), (5), (7), (8), or (10), and particularly preferably the method (3), (4), (7), (8), or (10) since a solid catalyst component for olefin polymerization that ensures high stereoregularity can be obtained. It is most preferable to produce the solid catalyst component (I) by suspending a dialkoxymagnesium and the component (A) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing a titanium halide into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), and the organosilicon compound represented by the general formula (7) (optional). The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with the above compounds. The solid catalyst component (I) is brought into contact with each component at a temperature of −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, the organosilicon compound that includes an Si—N—C linkage, and the organosilicon compound represented by the general formula (7) are normally used in an amount of 0.2 to 20 mol, preferably 0.5 to 10 mol, and particularly preferably 1 to 5 mol, per mol of the titanium atoms included in the solid catalyst component (1). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is 1/3 or less, and preferably 1/6 to 1/20 to obtain a powdery solid component.

The ratio of the components when producing the solid catalyst component (I) is determined depending on the production method. For example, the tetravalent titanium halide compound (C) is used in an amount of 0.5 to 100 mol, preferably 0.5 to 50 mol, and more preferably 1 to 10 mol, based on 1 mol of the magnesium compound (B). The component (A) (when the component (I) does not include the electron donor compound (D)), or a combination of the component (A) and the electron donor compound (D) (when the component (I) includes the electron donor compound (D)), is used in an amount of 0.01 to 10 mol, preferably 0.01 to 1 mol, and more preferably 0.02 to 0.6 mol, based on 1 mol of the magnesium compound (B). The solvent is used in an amount of 0.001 to 500 mol, preferably 0.001 to 100 mol, and more preferably 0.005 to 10 mol, based on 1 mol of the magnesium compound (B). The polysiloxane (E) is used in an amount of 0.01 to 100 g, preferably 0.05 to 80 g, and still more preferably 1 to 50 g, based on 1 mol of the magnesium compound (B).

Olefin Polymerization Catalyst

An olefin polymerization catalyst according to one embodiment of the invention is produced by bringing the solid catalyst component (I), (II) an organoaluminum compound (hereinafter may be referred to as "component (F)"), and (III) an external electron donor compound (hereinafter may be referred to as "component (G)") into contact with each other. An olefin can be polymerized or copolymerized in the presence of the catalyst. Note that the component (G) may not be used when the solid catalyst component (I) includes the organosilicon compound that includes an Si—O—C linkage, the organosilicon compound that includes an Si—N—C linkage, or the organoaluminum compound (reagent), or when the solid catalyst component that includes the reagent further includes the organosilicon compound represented by the general formula (7). Specifically, the catalyst formed by the solid catalyst component and the organo aluminum compound ensures excellent polymerization activity and hydrogen response even when the component (G) is not used.

The organoaluminum compound (II) is not particularly limited as long as the organoaluminum compound (II) is a compound represented by the general formula (2). Note that $R^3$ is preferably an ethyl group or an isobutyl group, Q is preferably a hydrogen atom, a chlorine atom, a bromine atom, an ethoxy group, or a phenoxy group, and p is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the olefin polymerization catalyst according to one embodiment of the invention include organic compounds that include an oxygen atom or a nitrogen atom. Examples of the organic compounds that include an oxygen atom or a nitrogen atom include alcohols, phenols, ethers, esters, ketones, acid halides, aldehydes, amines, amides, nitriles, isocyanates, and organosilicon compounds. The external electron donor compound (III) may be an organosilicon compound that includes an Si—O—C linkage, an aminosilane compound that includes an Si—N—C linkage, or the like. Note that the compound (A) (ether carbonate compound) may be used as the external electron donor compound.

Among these, esters such as ethyl benzoate, ethyl p-methoxybenzoate, ethyl p-ethoxybenzoate, methyl p-toluate, ethyl p-toluate, methyl anisate, and ethyl anisate, diethers, organosilicon compounds that include an Si—O—C linkage, and aminosilane compounds that include an Si—N—C linkage are preferable, and organosilicon compounds that include an Si—O—C linkage, aminosilane compounds that include an Si—N—C linkage, and 2-substituted 1,3-diethers are particularly preferable.

Examples of the organosilicon compounds that include an Si—O—C linkage and may be used as the external electron donor compound (III) include an alkoxysilane compound represented by the following general formula (3).

$$R^4_q Si(OR^5)_{4-q} \quad (3)$$

wherein $R^4$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms, provided that a plurality of $R^4$ are either identical or different when a plurality of $R^4$ are present, $R^5$ is an alkyl group having 1 to 4 carbon atoms, a cycloalkyl group having 3 to 6 carbon atoms, a phenyl group, a vinyl group, an allyl group, or an aralkyl group, provided that a plurality of $R^5$ are either identical or different when a plurality of $R^5$ are present, and q is an integer from 0 to 3.

Examples of the aminosilane compounds that include an Si—N—C linkage and may be used as the external electron donor compound (III) include an aminosilane compound represented by the following general formula (4).

$$(R^6 R^7 N)_s SiR^8_{4-s} \quad (4)$$

wherein $R^6$ and $R^7$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^6$ and $R^7$ are either identical or different, and optionally bond to each other to form a ring, $R^8$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, an aryloxy group, or a derivative thereof, provided that a plurality of $R^8$ are either identical or different when a plurality of $R^8$ are present, and s is an integer from 1 to 3.

Examples of the organosilicon compound include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound include phenyltrimethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimetoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. Among these, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like are preferable.

The 2-substituted 1,3-diethers are selected from a diether compound represented by the following general formula (5).

(5)

wherein $R^{10}$ and $R^{11}$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^{10}$ and $R^{11}$ are either identical or different, and optionally bond to each other to form a ring, and $R^9$ and $R^{12}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^9$ and $R^{12}$ are either identical or different.

Specific examples of the 2-substituted 1,3-diethers include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 2-isopropyl-2-isopentyl-1,3-dimethoxypropane, 9,9-bis(methoxymethyl)fluorene, and the like are preferable. These compounds may be used either alone or in combination.

Olefin Polymerization Method

In one embodiment of the invention, an olefin is polymerized or copolymerized in the presence of the olefin polymerization catalyst. Examples of the olefin include ethylene, propylene, 1-butene, 1-pentene, 4-methyl-1-pentene, vinylcyclohexane, and the like. These olefins may be used either alone or in combination. Among these, ethylene, propylene, and 1-butene are preferable. A particularly preferable olefin is propylene.

When polymerizing propylene, propylene may be copolymerized with another olefin. Examples of the olefin copolymerized with propylene include ethylene, 1-butene, 1-pentene, 4-methyl-1-pentene, vinylcyclohexane, and the like. These olefins may be used either alone or in combination. Among these, ethylene and 1-butene are preferable.

The ratio of each component is not particularly limited as long as the advantageous effects of the invention are not adversely affected. The organoaluminum compound (F) is normally used in an amount of 1 to 2000 mol, and preferably 50 to 1000 mol, per mol of the titanium atoms included in the solid catalyst component (I). The external electron donor compound (G) is used in an amount of 0.002 to 10 mol, preferably 0.01 to 2 mol, and particularly preferably 0.01 to 0.5 mol, per mol of the component (F).

The components may be brought into contact with each other in an arbitrary order. It is desirable to add the organoaluminum compound (F) to the polymerization system, and bring the component (I) into contact with the organoaluminum compound (F). The olefin may be polymerized in the presence or absence of an organic solvent. The olefin monomer such as propylene may be used either in a gaseous state or a liquid state. The polymerization temperature is 200° C. or less, and preferably 100° C. or less. The polymerization pressure is 10 MPa or less, and preferably 5 MPa or less. A continuous polymerization method or a batchwise polymerization method may be used. The polymerization reaction may be effected in one step, or two or more steps.

When polymerizing the olefin using the catalyst that includes the solid catalyst component for olefin polymerization, the organoaluminum compound, and the external electron donor compound (hereinafter may be referred to as "main polymerization"), it is desirable to effect preliminary polymerization prior to the main polymerization in order to further improve the catalytic activity, the stereoregularity, the properties of the resulting polymer particles, and the like. The olefin that is subjected to the main polymerization or a monomer such as styrene may be used for the preliminary polymerization.

The components and the monomer may be brought into contact with each other in an arbitrary order during the preliminary polymerization. Note that it is preferable to add the organoaluminum compound (F) to the preliminary polymerization system containing an inert gas atmosphere or an olefin gas atmosphere, bring the solid catalyst component (I) into contact with the component (F), and then bring the olefin (e.g., propylene) or a mixture of propylene and one or more additional olefins into contact with the mixture.

When effecting the preliminary polymerization using the component (G), it is desirable to add the component (F) to the preliminary polymerization system containing an inert gas atmosphere or an olefin gas atmosphere, bring the component (G) into contact with the component (F), bring the solid catalyst component (I) into contact with the mixture, and then bring the olefin (e.g., propylene) or a mixture of propylene and one or more additional olefins into contact with the mixture.

When producing a propylene block copolymer, two or more polymerization steps are performed. Propylene is normally polymerized in the first step in the presence of the polymerization catalyst, and ethylene and propylene are copolymerized in the second step. It is possible to copolymerize or polymerize an α-olefin other than propylene in the second or subsequent step. Examples of the α-olefin include ethylene, 1-butene, 4-methyl-1-pentene, vinylcyclohexane, 1-hexene, 1-octene, and the like. Specifically, the polymerization temperature and the polymerization time in the first step are adjusted so that the content of polypropylene blocks is 20 to 80 wt %. In the second step, ethylene and propylene or an additional α-olefin are introduced, and polymerized so that the content of rubber blocks (e.g., ethylene-propylene rubber (EPR)) is 20 to 80 wt %. The polymerization temperature in the first step and the second step is preferably 200° C. or less, and preferably 100° C. or less. The polymerization pressure is 10 MPa or less, and preferably 5 MPa or less. The polymerization time in each polymerization step (or the residence time when using continuous polymerization) is normally 1 minute to 5 hours.

Examples of the polymerization method include a slurry polymerization method that utilizes an inert hydrocarbon solvent such as cyclohexane or heptane, a bulk polymerization method that utilizes a solvent such as liquefied propylene, and a vapor-phase polymerization method in which a solvent is not substantially used. The bulk polymerization method and the vapor-phase polymerization method are preferable.

It is conjectured that the ether carbonate compound represented by the general formula (1) is configured so that the carbonyl oxygen atom of the carbonate group having a high coordination capability and the ether oxygen atom of the ether group having a low coordination capability are controlled at an appropriate distance in an appropriate coordination direction through a carbon atom having steric hindrance, and selectively coordinated to an appropriate site on the magnesium compound. Therefore, the support position of the titanium compound that forms an active site is restricted, and a large number of titanium active sites that ensure stereoregularity and high activity can be selectively formed. The ether oxygen atom of the ether group is easily removed from the coordination site due to low coordination capability. Therefore, the titanium active site is provided with a moderate degree of freedom, and a situation in which the molecular weight distribution unnecessarily becomes narrow is prevented. Since the solid catalyst component (I) includes the ether carbonate compound represented by the general formula (1) as an electron donor compound, an olefin polymer having a moderate molecular weight distribution can be obtained in high yield.

EXAMPLES

The invention is further described below by way of examples. Note that the following examples are for illustration purposes only, and the invention is not limited to the following examples.

Production Example 1

Synthesis of 2-ethoxyethyl-1-phenyl carbonate 50 g of phenyl chloroformate and 33 ml of 2-ethoxyethanol were dissolved in 300 ml of dichloromethane. After cooling the solution to 0° C. using ice water, 48 ml of triethylamine was added dropwise to the solution over 30 minutes. After the dropwise addition, the mixture was slowly heated to room temperature over 1 hour, and reacted for 12 hours. After completion of the reaction, the reaction product was purified by column separation and distillation to obtain 21 g of a product.

The product was subjected to $^1$H-NMR analysis, and it was found that the $^1$H-NMR chemical shift values were 1.25 (t, 3H), 3.58 (q, 21-1), 3.73 (m, 2H), 4.40 (t, 2H), 7.17-7.41 (m, 5H). It was thus confirmed that the product was 2-ethoxyethylphenyl carbonate. The purity of the resulting 2-ethoxyethyl-1-phenyl carbonate determined by GC was 96.9%.

Production Example 2

Synthesis of 2-benzyloxyethyl-1-phenyl carbonate 50 g of phenyl chloroformate and 51.9 g of 2-benzyloxyethanol were dissolved in 300 ml of dichloromethane. After cooling the solution to 0° C. using ice water, 48 ml of triethylamine was added dropwise to the solution over 30 minutes. After the dropwise addition, the mixture was slowly heated to room temperature over 1 hour, and reacted for 12 hours. After completion of the reaction, the reaction product was purified by column separation and distillation to obtain 28 g of a product.

The product was subjected to $^1$H-NMR analysis, and it was found that the $^1$H-NMR chemical shift values were 3.73 (m, 2H), 4.40-4.50 (m, 4H), 7.17-7.48 (m, 10H). It was thus confirmed that the product was 2-benzyloxyethyl-1-phenyl carbonate. The purity of the resulting 2-benzyloxyethyl-1-phenyl carbonate determined by GC was 97.5%.

Production Example 3

Synthesis of 2-ethoxyethyl-1-methyl carbonate 100 g of 2-ethoxyethanol was added dropwise to a mixture of 700 g of dimethyl carbonate and 230 g of potassium carbonate at 25° C. in a nitrogen atmosphere. The mixture was stirred for 16 hours, and filtered. The filtrate was concentrated, and purified by vacuum distillation to obtain 74 g of a product.

The product was subjected to $^1$H-NMR analysis, and it was found that the $^1$H-NMR chemical shift values were 1.16 (t, 311), 3.49 (q, 2H), 3.60-3.63 (m, 2H), 3.74 (s, 3H), 4.22-4.27 (m, 2H). It was thus confirmed that the product was 2-ethoxyethyl-1-methyl carbonate. The purity of the resulting 2-ethoxyethyl-1-methyl carbonate determined by GC was 99.0%.

Production Example 4

Synthesis of 2-methoxyethyl-1-methyl carbonate 100 g of 2-methoxyethanol was added dropwise to a mixture of 830 g of dimethyl carbonate and 270 g of potassium carbonate at 25° C. in a nitrogen atmosphere. The mixture was stirred for 16 hours, and filtered. The filtrate was concentrated, and purified by vacuum distillation to obtain 61 g of a product.

The product was subjected to $^1$H-NMR analysis, and it was found that the $^1$H-NMR chemical shift values were 3.34 (s, 3H), 3.55-3.60 (m, 2H), 3.74 (s, 3H), 4.22-4.26 (m, 2H). It was thus confirmed that the product was 2-methoxyethyl-1-methyl carbonate. The purity of the resulting 2-methoxyethyl-1-methyl carbonate determined by GC was 99.0%.

Production Example 5

Synthesis of 2-ethoxyethyl-1-(p-methylphenyl) carbonate 62.7 g of pyridine was added to a solution of 29 g of 2-ethoxyethanol in 1000 ml of dichloromethane at 0° C. 45 g of p-tolylchloroformic acid was then added dropwise to the mixture at 0° C. After stirring the mixture at 20° C. for 16 hours, the reaction was terminated by adding water, and the organic layer was extracted with dichloromethane. The extract was washed with salt water and a sodium hydrogen carbonate aqueous solution, concentrated, and purified by vacuum distillation to obtain 41 g of a product.

The product was subjected to $^1$H-NMR analysis, and it was found that the $^1$H-NMR chemical shift values were 1.27 (t, 3H), 2.37 (s, 3H), 3.60 (q, 2H), 3.72-3.76 (m, 2H), 4.38-4.43 (m, 2H), 7.06-7.10 (m, 2H), 7.19 (d, 2H). It was thus confirmed that the product was 2-ethoxyethyl-1-(p-methylphenyl) carbonate. The purity of the resulting 2-ethoxyethyl-1-(p-methylphenyl) carbonate determined by GC was 98%.

Example 1

Synthesis of Solid Catalyst Component (A)

A 500 ml flask equipped with a stirrer, of which the internal atmosphere had been sufficiently replaced with nitrogen gas, was charged with 10 g (87.4 mmol) of diethoxymagnesium and 55 ml of toluene to prepare a suspension. After the addition of 30 ml of titanium tetrachloride and 3.21 g (15.3 mmol) of 2-ethoxyethyl-1-phenyl carbonate to the suspension, the mixture was heated to 90° C. The mixture was reacted at 90° C. for 90 minutes. After completion of the reaction, the supernatant liquid was removed. After the addition of 20 ml of TiCl$_4$, the mixture was reacted at 100° C. for 2 hours. After completion of the reaction, the resulting reaction product was washed four times with 75 ml of toluene (100° C.). The mixture was the washed six times with 75 ml of n-heptane (40° C.) to obtain a solid catalyst component (A). The titanium content in the solid catalyst component was measured after solid-liquid separation, and found to be 3.2 wt %.

Preparation of Polymerization Catalyst and Evaluation of Polymerization

A 2.0 l autoclave equipped with a stirrer, of which the internal atmosphere had been completely replaced with nitrogen gas, was charged with 1.32 mmol of triethylaluminum, 0.13 mmol of dicyclopentyldimethoxysilane (DCPDMS), and the solid catalyst component (A) (0.0026 mmol on a titanium atom basis) to prepare a polymerization catalyst. After the addition of 1.5 l of hydrogen gas and 1.4 l of liquefied propylene, preliminary polymerization was effected at 20° C. for 5 minutes. The mixture was heated to 70° C., and polymerized for 1 hour. Table 1 shows the polymerization activity per gram of the solid catalyst component, the p-xylene-soluble content (XS) in the resulting polymer, the melt flow rate (MFR) of the polymer, and the molecular weight distribution of the polymer.

Polymerization Activity Per Gram of Solid Catalyst Component

The polymerization activity per gram of the solid catalyst component was calculated using the following expression.

Polymerization Activity (g-Pp/g-Catalyst)=Mass (g) of Polymer/Mass (g) of Solid Catalyst Component Measurement of Xylene-Soluble Content (XS) in Polymer A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) lower than the boiling point. The solution was cooled to 23° C. over 1 hour, and an insoluble component and a soluble component were separated by filtration. A solution of the soluble component was collected, and p-xylene was evaporated by heating and drying under reduced pressure. The weight of the residue (xylene-soluble component) was calculated as a value (wt %) relative to the weight of the polymer (polypropylene), and taken as the xylene-soluble content (XS).

Melt Flow Rate (MFR) of Polymer

The melt flow rate (MFR) (melt flow index) of the polymer was measured in accordance with ASTM D 1238 (JIS K 7210).

Measurement of Molecular Weight Distribution of Polymer

The molecular weight distribution of the polymer was evaluated by the ratio (Mw/Mn) of the weight average molecular weight (Mw) to the number average molecular weight (Mn) measured by gel permeation chromatography (GPC) ("Alliance GPC/V2000" manufactured by Waters) under the following conditions.

Solvent: o-dichlorobenzene (ODCB)
Measurement temperature: 140° C.
Column: ST-806×3, HT-803×1 (manufactured by Showa Denko K.K.)
Sample concentration: 1 mg/ml-ODCB (10 mg/10 ml-ODCB)
Injection amount: 0.5 ml
Flow rate: 1.0 ml/min

Example 2

A polymerization catalyst was prepared, and polymerization was effected (evaluated) in the same manner as in Example 1, except that 0.13 mmol of diisopropyldimethoxysilane (DIPDMS) was used instead of 0.13 mmol of dicyclopentyldimethoxysilane (DCPDMS). The polymerization results are shown in Table 1.

Comparative Example 1

Synthesis of Solid Catalyst Component (B)

A solid catalyst component (B) was prepared in the same manner as in Example 1, except that 15.3 mmol of commercially available 2-ethoxyethyl benzoate was used instead of 15.3 mmol of 2-ethoxyethyl-1-phenyl carbonate.

Preparation of Polymerization Catalyst and Polymerization

A polymerization catalyst was prepared, and polymerization was effected (evaluated) in the same manner as in Example 1, except that the solid catalyst component (B) was used instead of the solid catalyst component (A). The titanium content in the solid catalyst component was 3.5 wt %. The polymerization results are shown in Table 1.

Comparative Example 2

A polymerization catalyst was prepared, and polymerization was effected (evaluated) in the same manner as in Example 1, except that diisopentyldimethoxysilane (DIPDMS) was used instead of dicyclopentyldimethoxysilane (DCPDMS). The polymerization results are shown in Table 1.

Example 3

Synthesis of Solid Catalyst Component (C)

A solid catalyst component (C) was prepared in the same manner as in Example 1, except that 15.3 mmol of 2-benzyloxyethyl-1-phenyl carbonate obtained in Production Example 2 was used instead of 15.3 mmol of 2-ethoxyethyl-1-phenyl carbonate.

Preparation of Polymerization Catalyst and Polymerization

A polymerization catalyst was prepared, and polymerization was effected (evaluated) in the same manner as in Example 1, except that the solid catalyst component (C) was used instead of the solid catalyst component (A). The titanium content in the solid catalyst component was 2.9 wt %. The polymerization results are shown in Table 1.

Example 4

Preparation of Polymerization Catalyst and Polymerization

A polymerization catalyst was prepared, and polymerization was effected (evaluated) in the same manner as in Example 3, except that 0.13 mmol of diisopropyldimethoxysilane (DIPDMS) was used instead of 0.13 mmol of dicyclopentyldimethoxysilane (DCPDMS). The polymerization results are shown in Table 1.

Example 5

Preparation of Solid Catalyst Component (D)

A 500 ml round-bottom flask, of which the internal atmosphere had been sufficiently replaced with nitrogen, was charged with 120 ml of purified n-heptane. After the addition of 15 g of anhydrous magnesium chloride and 106 ml of Ti(O-n-Bu)$_4$, the mixture was reacted at 90° C. for 1.5 hours to obtain a homogenous solution. The solution was cooled to 40° C. After the addition of 24 ml of methyl hydrogen polysiloxane (viscosity: 20 cSt) while maintaining the solution at 40° C., the mixture was subjected to a precipitation reaction for 5 hours. A precipitated solid product was sufficiently washed with purified n-heptane. A 500 ml round-bottom flask equipped with a stirrer, of which the internal atmosphere had been sufficiently replaced with nitrogen, was charged with 40 g of the solid product, and purified n-heptane was added to the flask so that the concentration of the solid product was 200 mg/ml. After the addition of 12 nil of SiCl$_4$, the mixture was reacted at 90° C. for 3 hours. The reaction product was sufficiently washed with purified n-heptane, and purified n-heptane was added to the flask so that the concentration of the reaction product was 100 mg/ml.

After the addition of 10 mmol of 2-ethoxyethyl-1-phenyl carbonate in Production Example 1, the mixture was reacted at 70° C. for 1 hour. The reaction product was sufficiently washed with purified n-heptane, followed by the addition of 100 ml of purified n-heptane. After the addition of 20 ml of TiCl$_4$, the mixture was reacted at 95° C. for 3 hours. After completion of the reaction, the supernatant liquid was removed. After the addition of 20 ml of TiCl$_4$, the mixture was reacted at 100° C. for 2 hours. The reaction product was sufficiently washed with purified n-heptane. The resulting solid product was dried under reduced pressure to obtain a powdery solid catalyst component (D). The titanium content in the solid catalyst component (D) was 3.4 wt %.

Preparation of Polymerization Catalyst and Polymerization

A polymerization catalyst was prepared, and polymerization was effected (evaluated) in the same manner as in Example 1, except that the solid catalyst component (D) was used instead of the solid catalyst component (A). The polymerization results are shown in Table 1.

Comparative Example 3

Preparation of Solid Catalyst Component (E)

A solid catalyst component (E) was prepared in the same manner as in Example 5, except that 10 mmol of 2-ethoxyethyl benzoate was used instead of 10 mmol of 2-ethoxyethyl-1-phenyl carbonate.

Preparation of Polymerization Catalyst and Polymerization

A polymerization catalyst was prepared, and polymerization was effected (evaluated) in the same manner as in Example 1, except that the solid catalyst component (E) was used instead of the solid catalyst component (A). The titanium content in the solid catalyst component was 3.7 wt %. The polymerization results are shown in Table 1.

Example 6

Preparation of Solid Catalyst Component (F)

A solid catalyst component (F) was prepared in the same manner as in Example 1, except that 15.3 mmol of 2-ethoxyethyl-1-methyl carbonate obtained in Production Example 3 was used instead of 15.3 mmol of 2-ethoxyethyl-1-phenyl carbonate.

Preparation of Polymerization Catalyst and Polymerization

A polymerization catalyst was prepared, and polymerization was effected (evaluated) in the same manner as in Example 1, except that the solid catalyst component (F) was used instead of the solid catalyst component (A). The titanium content in the solid catalyst component was 1.7 wt %. The polymerization results are shown in Table 2.

Example 7

Preparation of Solid Catalyst Component (G)

A solid catalyst component (G) was prepared in the same manner as in Example 1, except that 15.3 mmol of 2-methoxyethyl-1-methyl carbonate obtained in Production Example 4 was used instead of 15.3 mmol of 2-ethoxyethyl-1-phenyl carbonate.

Preparation of Polymerization Catalyst and Polymerization

A polymerization catalyst was prepared, and polymerization was effected (evaluated) in the same manner as in Example 1, except that the solid catalyst component (G) was used instead of the solid catalyst component (A). The titanium content in the solid catalyst component was 1.5 wt %. The polymerization results are shown in Table 2.

Example 8

Preparation of Solid Catalyst Component (H)

A solid catalyst component (H) was prepared in the same manner as in Example 1, except that 15.3 mmol of 2-ethoxyethyl-1-(p-methylphenyl) carbonate obtained in Production Example 5 was used instead of 15.3 mmol of 2-ethoxyethyl-1-phenyl carbonate.
Preparation of Polymerization Catalyst and Polymerization A polymerization catalyst was prepared, and polymerization was effected (evaluated) in the same manner as in Example 1, except that the solid catalyst component (H) was used instead of the solid catalyst component (A). The titanium content in the solid catalyst component was 2.7 wt %. The polymerization results are shown in Table 2.

Example 9

Preparation of Solid Catalyst Component (I)

A 200 ml flask equipped with a stirrer, of which the internal atmosphere had been sufficiently replaced with nitrogen gas, was charged with 5.6 g of the solid catalyst component obtained in Example 1 and 70 ml of heptane to prepare a suspension. The suspension was heated to 30° C. 6 mmol of divinyldimethylsilane, 18 mmol of triethylaluminum, and 6 mmol of dicyclopentyldimethoxysilane were sequentially added to the suspension with stirring. After the addition of 15 ml of heptane, the mixture was reacted at 30° C. for 2 hours. After completion of the reaction, the supernatant liquid was removed by decantation. The solid component in the flask was washed three times with 150 ml of heptane (30° C.) to obtain a solid catalyst component (I). The titanium content in the solid catalyst component was 2.0 wt %.
Preparation of Polymerization Catalyst and Polymerization A polymerization catalyst was prepared, and polymerization was effected (evaluated) in the same manner as in Example 1, except that the solid catalyst component (I) was used instead of the solid catalyst component (A), and 0.13 mmol of dicyclopentyldimethoxysilane (DCPDMS) was not added. Specifically, the polymerization catalyst was formed by the solid catalyst component (I) and triethylaluminum. The polymerization results are shown in Table 2.

Example 10

Synthesis of Solid Catalyst Component (J)

A 500 ml flask equipped with a stirrer, of which the internal atmosphere had been sufficiently replaced with nitrogen gas, was charged with 10 g (87.4 mmol) of diethoxymagnesium, 55 ml of toluene, 30 ml of titanium tetrachloride, and 3.8 g (15.3 mmol) of diethyl diisobutylmalonate. The mixture was heated to 100° C. The mixture was reacted at 100° C. for 90 minutes. After completion of the reaction, the resulting reaction product was washed four times with 75 ml of toluene (100° C.). After the addition of 100 ml of a 10 vol % toluene solution of titanium tetrachloride and 2.64 mmol of 2-ethoxyethyl-1-phenyl carbonate, the mixture was heated to 100° C., and reacted for 15 minutes with stirring. After completion of the reaction, the resulting reaction product was washed once with toluene (100° C.). After repeating the above operation twice, the mixture was washed six times with 75 ml of n-heptane (40° C.) to obtain a solid catalyst component (J). The solid catalyst component (J) was subjected to solid-liquid separation, and the titanium content, the diethyl diisobutylmalonate content, and the 2-ethoxyethyl-1-phenyl carbonate content in the solid were measured, and found to be 1.7 wt %, 7.7 wt %, and 4.2 wt %, respectively.
Preparation of Polymerization Catalyst and Polymerization A polymerization catalyst was prepared, and polymerization was effected (evaluated) in the same manner as in Example 1, except that the solid catalyst component (J) was used instead of the solid catalyst component (A). The polymerization results are shown in Table 2.

Example 11

Synthesis of Solid Catalyst Component (K)

A 500 ml flask equipped with a stirrer, of which the internal atmosphere had been sufficiently replaced with nitrogen gas, was charged with 10 g (87.4 mmol) of diethoxymagnesium, 55 ml of toluene, 30 ml of titanium tetrachloride, and 15.3 mmol of diethyl benzylidenemalonate, and 2.2 mmol of (2-ethoxyethyl)(p-methylphenyl) carbonate. The mixture was heated to 100° C. The mixture was reacted at 100° C. for 90 minutes. After completion of the reaction, the resulting reaction product was washed four times with 75 ml of toluene (100° C.). After the addition of 100 ml of a 10 vol % toluene solution of titanium tetrachloride, the mixture was heated to 100° C., and reacted for 15 minutes with stirring. After completion of the reaction, the resulting reaction product was washed once with toluene (100° C.). After repeating the above operation twice, the mixture was washed six times with 75 ml of n-heptane (40° C.) to obtain a solid catalyst component (K). The solid catalyst component (K) was subjected to solid-liquid separation, and the titanium content, the diethyl benzylidenemalonate content, and the (2-ethoxyethyl)(p-methylphenyl) carbonate content in the solid were measured, and found to be 2.2 wt %, 9.2 wt %, and 3.1 wt %, respectively.
Preparation of Polymerization Catalyst and Polymerization A polymerization catalyst was prepared, and polymerization was effected (evaluated) in the same manner as in Example 1, except that the solid catalyst component (K) was used instead of the solid catalyst component (A). The polymerization results are shown in Table 2.

TABLE 1

| Example | Internal donor | External donor | Polymerization activity (g-PP/g-cat.) | XS (wt %) | MFR (g/10 min) | Mw/Mn |
|---|---|---|---|---|---|---|
| Example 1 | 2-Ethoxyethylphenyl carbonate | DCPDMS | 43,500 | 0.9 | 2.1 | 5.2 |
| Example 2 | 2-Ethoxyethylphenyl carbonate | DIPDMS | 45,800 | 1.1 | 4.2 | 4.7 |
| Comparative | 2-Ethoxyethyl benzoate | DCPDMS | 28,700 | 3.3 | 8.5 | 6.3 |

TABLE 1-continued

| Example | Internal donor | External donor | Polymerization activity (g-PP/g-cat.) | XS (wt %) | MFR (g/10 min) | Mw/Mn |
|---|---|---|---|---|---|---|
| Example 1 Comparative Example 2 | 2-Ethoxyethyl benzoate | DIPDMS | 30,400 | 3.5 | 16 | 5.5 |
| Example 3 | 2-Benzyloxyethylphenyl carbonate | DCPDMS | 55,000 | 0.8 | 2.5 | 5.5 |
| Example 4 | 2-Benzyloxyethylphenyl carbonate | DIPDMS | 49,500 | 1.0 | 5.1 | 4.9 |
| Example 5 | 2-Ethoxyethylphenyl carbonate | DCPDMS | 38,500 | 1.0 | 2.7 | 4.7 |
| Comparative Example 3 | 2-Ethoxyethyl benzoate | DCPDMS | 17,000 | 2.8 | 5.3 | 5.7 |

TABLE 2

| Example | Internal donor | External donor | Polymerization activity | XS (wt %) | MFR (g/10 min) | Mw/Mn |
|---|---|---|---|---|---|---|
| Example 6 | 2-Ethoxyethyl-1-methyl carbonate | DCPDMS | 40,700 | 0.8 | 1.9 | 5.6 |
| Example 7 | 2-Ethoxyethyl-1-methyl carbonate | DCPDMS | 32,600 | 0.8 | 1.8 | 5.4 |
| Example 8 | 2-Ethoxyethyl-1-(p-methylphenyl) carbonate | DCPDMS | 41,300 | 1.1 | 2.1 | 6.0 |
| Example 9 | 2-Ethoxyethyl-1-phenyl carbonate + DVDMS + TEA + DCPDMS | — | 56,800 | 2.5 | 4.0 | 6.0 |
| Example 10 | Diethyl diisobutylmalonate + 2-ethoxyethyl-1-phenyl carbonate | DCPDMS | 53,900 | 1.4 | 3.0 | 5.5 |
| Example 11 | 2-Ethoxyethyl-p-methylphenyl carbonate + diethyl benzylidenemalonate | DCPDMS | 55,500 | 1.4 | 2.9 | 5.4 |

DVDMS: divinyldimethylsilane,
TEA: triethylaluminum

INDUSTRIAL APPLICABILITY

The olefin polymerization catalyst according to the embodiments of the invention makes it possible to produce an olefin polymer having a moderate molecular weight and molecular weight distribution corresponding to the application in high yield while maintaining high stereoregularity. Therefore, the olefin polymerization catalyst makes it possible to inexpensively provide a general-purpose polyolefin that can be produced using an existing molding machine, and may also be useful for the production of a high-performance olefin copolymer.

The invention claimed is:

1. A solid catalyst component for olefin polymerization before forming an olefin polymerization catalyst, comprising:
    titanium,
    magnesium,
    a halogen, and
    a compound represented by formula (I),

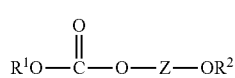

(I)

wherein
  $R^1$ and $R^2$ are each independently a linear alkyl group comprising 1 to 20 carbon atoms, a branched alkyl group comprising 3 to 20 carbon atoms, a vinyl group, a linear or branched alkenyl group comprising 3 to 20 carbon atoms, a linear halogen-substituted alkyl group comprising 1 to 20 carbon atoms, a branched halogen-substituted alkyl group comprising 3 to 20 carbon atoms, a linear halogen-substituted alkenyl group comprising 2 to 20 carbon atoms, a branched halogen-substituted alkenyl group comprising 3 to 20 carbon atoms, a cycloalkyl group comprising 3 to 20 carbon atoms, a cycloalkenyl group comprising 3 to 20 carbon atoms, a halogen-substituted cycloalkyl group comprising 3 to 20 carbon atoms, a halogen-substituted cycloalkenyl group comprising 3 to 20 carbon atoms, an aromatic hydrocarbon group comprising 6 to 24 carbon atoms, or a halogen-substituted aromatic hydrocarbon group comprising 6 to 24 carbon atoms, and
  Z is a linking group that includes a carbon atom or a carbon chain.

2. The solid catalyst component according to claim 1, wherein Z is a linear alkylene group comprising 1 to 20 carbon atoms, a branched alkylene group comprising 3 to 20 carbon atoms, a vinylene group, a linear or branched alkenylene group comprising 3 to 20 carbon atoms, a linear halogen-substituted alkylene group comprising 1 to 20 carbon atoms, a branched halogen-substituted alkylene group comprising 3 to 20 carbon atoms, a linear or branched halogen-substituted alkenylene group comprising 3 to 20 carbon atoms, a cycloalkylene group comprising 3 to 20 carbon atoms, a cycloalkenylene group comprising 3 to 20 carbon atoms, a halogen-substituted cycloalkylene group comprising 3 to 20 carbon atoms, a halogen-substituted cycloalkenylene group comprising 3 to 20 carbon atoms, an aromatic hydrocarbon group comprising 6 to 24 carbon atoms, a halogen-substituted aromatic hydrocarbon group comprising 6 to 24 carbon atoms, a nitrogen atom-comprising hydrocarbon group comprising 1 to 24 carbon atoms, an oxygen atom-comprising hydrocarbon group comprising 1 to 24 carbon atoms, a phosphorus-comprising hydrocarbon group comprising 1 to 24 carbon atoms, or a silicon-comprising hydrocarbon group comprising 1 to 24 carbon atoms.

3. The solid catalyst component according to claim 1, wherein

Z is a linear alkylene group comprising 2 carbon atoms, a branched alkylene group comprising 3 to 12 carbon atoms, a vinylene group, a linear or branched alkenylene group comprising 3 to 12 carbon atoms, a linear halogen-substituted alkylene group comprising 2 to 12 carbon atoms, a branched halogen-substituted alkylene group comprising 3 to 12 carbon atoms, a linear or branched halogen-substituted alkenylene group comprising 3 to 12 carbon atoms, a cycloalkylene group comprising 3 to 12 carbon atoms, a cycloalkenylene group comprising 3 to 12 carbon atoms, a halogen-substituted cycloalkylene group comprising 3 to 12 carbon atoms, a halogen-substituted cycloalkenylene group comprising 3 to 12 carbon atoms, an aromatic hydrocarbon group comprising 6 to 12 carbon atoms, a halogen-substituted aromatic hydrocarbon group comprising 6 to 12 carbon atoms, a nitrogen atom-comprising hydrocarbon group comprising 2 to 12 carbon atoms, an oxygen atom-comprising hydrocarbon group comprising 2 to 12 carbon atoms, a phosphorus-comprising hydrocarbon group comprising 2 to 12 carbon atoms, or a silicon-comprising hydrocarbon group comprising 2 to 12 carbon atoms.

4. The solid catalyst component according to claim 1, wherein $R^1$ is a linear alkyl group comprising 1 to 12 carbon atoms, a branched alkyl group comprising 3 to 12 carbon atoms, a vinyl group, a linear or branched alkenyl group comprising 3 to 12 carbon atoms, a linear halogen-substituted alkyl group comprising 1 to 12 carbon atoms, a branched halogen-substituted alkyl group comprising 3 to 12 carbon atoms, a linear or branched halogen-substituted alkenyl group comprising 3 to 12 carbon atoms, a cycloalkyl group comprising 3 to 12 carbon atoms, a cycloalkenyl group comprising 3 to 12 carbon atoms, a halogen-substituted cycloalkyl group comprising 3 to 12 carbon atoms, a halogen-substituted cycloalkenyl group comprising 3 to 12 carbon atoms, or an aromatic hydrocarbon group comprising 6 to 12 carbon atoms.

5. The solid catalyst component according to claim 1, wherein $R^2$ is a linear alkyl group comprising 1 to 12 carbon atoms, a branched alkyl group comprising 3 to 12 carbon atoms, a vinyl group, a linear or branched alkenyl group comprising 3 to 12 carbon atoms, a cycloalkyl group comprising 3 to 12 carbon atoms, a cycloalkenyl group comprising 3 to 12 carbon atoms, a halogen-substituted cycloalkyl group comprising 3 to 12 carbon atoms, a halogen-substituted cycloalkenyl group comprising 3 to 12 carbon atoms, a linear halogen-substituted alkyl group comprising 1 to 12 carbon atoms, a branched halogen-substituted alkyl group comprising 3 to 12 carbon atoms, a linear halogen-substituted alkenyl group comprising 2 to 12 carbon atoms, a branched halogen-substituted alkenyl group comprising 3 to 12 carbon atoms, a halogen-substituted cycloalkyl group comprising 3 to 12 carbon atoms, a halogen-substituted cycloalkenyl group comprising 3 to 12 carbon atoms, an aromatic hydrocarbon group comprising 6 to 12 carbon atoms, or a halogen-substituted aromatic hydrocarbon group comprising 6 to 12 carbon atoms.

6. The solid catalyst component according to claim 1, wherein $R^2$ is a linear alkyl group comprising 1 to 12 carbon atoms, a branched alkyl group comprising 3 to 12 carbon atoms that is terminated by —CH$_2$—, a branched alkenyl group comprising 3 to 12 carbon atoms that is terminated by —CH$_2$—, a branched halogen-substituted alkyl group comprising 3 to 12 carbon atoms that is terminated by —CH$_2$—, a branched halogen-substituted alkenyl group comprising 3 to 12 carbon atoms that is terminated by —CH$_2$—, a cycloalkyl group comprising 4 to 12 carbon atoms that is terminated by —CH$_2$—, a cycloalkenyl group comprising 4 to 12 carbon atoms that is terminated by —CH$_2$—, a halogen-substituted cycloalkyl group comprising 4 to 12 carbon atoms that is terminated by —CH$_2$—, a halogen-substituted cycloalkenyl group comprising 4 to 12 carbon atoms that is terminated by —CH$_2$—, or an aromatic hydrocarbon group comprising 7 to 12 carbon atoms that is terminated by —CH$_2$—.

7. An olefin polymerization catalyst, comprising:
the solid catalyst component for olefin polymerization according to claim 1, and
an organoaluminum compound represented by formula (II), $$R^3_p AlQ_{3-p} \qquad (II)$$

wherein
$R^3$ is a hydrocarbyl group comprising 1 to 6 carbon atoms, provided that a plurality of $R^3$ are either identical or different when a plurality of $R^3$ are present,
Q is a hydrogen atom, a hydrocarbyloxy group comprising 1 to 6 carbon atoms, or a halogen atom, and
p is a real number that satisfies 0<p≤3.

8. The olefin polymerization catalyst according to claim 7, further comprising an external electron donor compound.

9. The olefin polymerization catalyst according to claim 8, wherein the external electron donor compound is at least one compound selected from an organosilicon compound represented by formula (III) and an aminosilane compound represented by formula (IV), $$R^4_q Si(OR^5)_{4-q} \qquad (III)$$

wherein
$R^4$ is an alkyl group comprising 1 to 12 carbon atoms, a vinyl group, an alkenyl group comprising 3 to 12 carbon atoms, a cycloalkyl group comprising 3 to 12 carbon atoms, a cycloalkenyl group comprising 3 to 12 carbon atoms, an aromatic hydrocarbon group comprising 6 to 15 carbon atoms, or a substituted aromatic hydrocarbon group, provided that a plurality of $R^4$ are either identical or different when a plurality of $R^4$ are present,
$R^5$ is an alkyl group comprising 1 to 4 carbon atoms, a vinyl group, an alkenyl group comprising 3 to 12 carbon atoms, a cycloalkyl group comprising 3 to 6 carbon atoms, an aromatic hydrocarbon group comprising 6 to 12 carbon atoms, or a substituted aromatic hydrocarbon group comprising 7 to 12 carbon atoms, provided that a plurality of $R^5$ are either identical or different when a plurality of $R^5$ are present, and
q is an integer from 0 to 3, $$(R^6R^7N)_s SiR^8_{4-s} \qquad (IV)$$

wherein
$R^6$ and $R^7$ are a hydrogen atom, an alkyl group comprising 1 to 20 carbon atoms, a vinyl group, an alkenyl group comprising 3 to 20 carbon atoms, a cycloalkyl group comprising 3 to 20 carbon atoms, a cycloalkenyl group comprising 3 to 20 carbon atoms, or an aryl group comprising 6 to 20 carbon atoms, provided that $R^6$ and $R^7$ are either identical or different, and optionally bond to each other to form a ring,
$R^8$ is an alkyl group comprising 1 to 20 carbon atoms, a vinyl group, an alkenyl group comprising 3 to 12 carbon atoms, an alkoxy group comprising 1 to 20 carbon atoms, a vinyloxy group, an alkenyloxy group comprising 3 to 20 carbon atoms, a cycloalkyl group comprising 3 to 20 carbon atoms, a cycloalkyloxy group comprising 3 to 20 carbon atoms, an aryl group comprising 6 to 20 carbon atoms, or an aryloxy group comprising 6 to 20 carbon atoms, provided that a plurality of $R^8$ are either identical or different when a plurality of $R^8$ are present, and s is an integer from 1 to 3.

10. The olefin polymerization catalyst according to claim 8, wherein the external electron donor compound is phenyltrimethoxysilane, n-butyltrimethoxysilane, cyclopentyltrimethoxysilane, cyclohexyltrimethoxysilane, phenyltriethoxysilane, n-butyltriethoxysilane, cyclopentyltriethoxysilane, cyclohexyltriethoxysilane, t-butylmethyldimethoxysilane, t-butylethyldimethoxysilane, diisopropyldimethoxysilane, diisobutyldimethoxysilane, diisopentyldimethoxysilane, diphenyldimethoxysilane, dicyclopentyldimethoxysilane, cyclohexylmethyldimethoxysilane, cyclohexylcyclopentyldimethoxysilane, tetramethoxysilane, tetraethoxysilane, t-butylmethylbis(ethylamino)silane, dicyclohexylbis(ethylamino)silane, dicyclopentylbis(ethylamino)silane, bis(perhydroisoquinolino)dimethoxysilane, diethylaminotrimethoxysilane, or diethylaminotriethoxysilane.

11. The olefin polymerization catalyst according to claim 8, wherein the external electron donor compound is a 1,3-diether compound represented by formula (V), $$R^9OCH_2CR^{10}R^{11}CH_2OR^{12} \qquad (V)$$

wherein $R^{10}$ and $R^{11}$ are a hydrogen atom, a halogen atom, an alkyl group comprising 1 to 12 carbon atoms, a vinyl group, an alkenyl group comprising 3 to 12 carbon atoms, a cycloalkyl group comprising 3 to 12 carbon atoms, a cycloalkenyl group comprising 3 to 12 carbon atoms, an aromatic hydrocarbon group comprising 6 to 12 carbon atoms, a halogen-substituted aromatic hydrocarbon group comprising 6 to 12 carbon atoms, a substituted aromatic hydrocarbon group comprising 7 to 12 carbon atoms, an alkylamino group comprising 1 to 12 carbon atoms, or a dialkylamino group comprising 2 to 12 carbon atoms, provided that $R^{10}$ and $R^{11}$ are either identical or different, and optionally bond to each other to form a ring, and $R^9$ and $R^{12}$ are each independently an alkyl group comprising 1 to 12 carbon atoms, a vinyl group, an alkenyl group comprising 3 to 12 carbon atoms, a cycloalkyl group comprising 3 to 6 carbon atoms, an aromatic hydrocarbon group comprising 6 to 12 carbon atoms, a halogen-substituted aromatic hydrocarbon group comprising 6 to 12 carbon atoms, or a substituted aromatic hydrocarbon group comprising 7 to 12 carbon atoms, provided that $R^9$ and $R^{12}$ are either identical or different.

12. The olefin polymerization catalyst according to claim 11, wherein the 1,3-diether compound is 2-isopropyl-2-isobutyl-1,3-dimethoxypropane, 2-isopropyl-2-isopentyl-1,3-dimethoxypropane, or 9,9-bis(methoxymethyl)fluorene.

13. A method for producing an olefin polymer, the method comprising:

polymerizing an olefin in the presence of the olefin polymerization catalyst according to claim 7.

* * * * *